United States Patent
Kakizawa et al.

(10) Patent No.: US 10,115,140 B2
(45) Date of Patent: Oct. 30, 2018

(54) CUSTOMER MANAGEMENT DEVICE, CUSTOMER MANAGEMENT SYSTEM AND CUSTOMER MANAGEMENT METHOD

(71) Applicant: PANASONIC INTELLECTUAL PROPERTY MANAGEMENT CO., LTD., Osaka (JP)

(72) Inventors: Tetsurou Kakizawa, Kanagawa (JP); Kazuhiko Iwai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 893 days.

(21) Appl. No.: 14/529,226

(22) Filed: Oct. 31, 2014

(65) Prior Publication Data
US 2015/0127485 A1    May 7, 2015

(30) Foreign Application Priority Data
Nov. 7, 2013   (JP) .................................. 2013-231069

(51) Int. Cl.
    *G06Q 30/06*    (2012.01)
    *G06K 9/00*     (2006.01)

(52) U.S. Cl.
    CPC ..... *G06Q 30/0613* (2013.01); *G06K 9/00771* (2013.01)

(58) Field of Classification Search
    None
    See application file for complete search history.

(56) References Cited

U.S. PATENT DOCUMENTS

| 8,918,327 B2 | 12/2014 | Hirakawa et al. |
| 2005/0043996 A1* | 2/2005 | Silver .................... G06Q 10/02 705/15 |

(Continued)

FOREIGN PATENT DOCUMENTS

| JP | 07-249138 | 9/1995 |
| JP | 2000-011074 | 1/2000 |

(Continued)

OTHER PUBLICATIONS

Gregory Ferenstein, "Facedeals: Check-In on Facebook With Facial Recognition. Creepy or Awesome?" Techcrunch Aug. 10, 2012 http://tcrn.ch/NRsiUd (Year: 2012).*

(Continued)

*Primary Examiner* — Kathleen Palavecino
*Assistant Examiner* — Lance Y Cai
(74) *Attorney, Agent, or Firm* — Greenblum & Bernstein, P.L.C.

(57) ABSTRACT

A customer management device for managing states of customers visiting a commercial establishment that provides articles or services to the customers in response to orders from the customers, includes: a first image obtainer that obtains customer images of customers captured at some point from when the customers enter the commercial establishment till when the customers go through reception procedures; a second image obtainer that obtains customer images of customers captured at least either when the customers receive the articles or services or when the customers make payment; a customer information manager that, based on the customer images obtained by the first image obtainer and the second image obtainer, generates and manages customer information relating to customers in a state of waiting for provision of the articles or services; and a customer information provider that provides a user with (Continued)

the customer information managed by the customer information manager.

6 Claims, 13 Drawing Sheets

(56) References Cited

U.S. PATENT DOCUMENTS

| | | | |
|---|---|---|---|
| 2005/0046570 A1* | 3/2005 | Conzola | G06Q 10/087 340/568.1 |
| 2012/0246007 A1* | 9/2012 | Williams | G06Q 30/02 705/14.66 |
| 2014/0214484 A1 | 7/2014 | Hirakawa et al. | |
| 2014/0222501 A1 | 8/2014 | Hirakawa et al. | |
| 2014/0292500 A1* | 10/2014 | Hetterly | G08B 7/068 340/286.09 |
| 2014/0358639 A1 | 12/2014 | Takemoto et al. | |
| 2015/0046271 A1* | 2/2015 | Scholl | G06Q 30/02 705/15 |
| 2015/0088671 A1* | 3/2015 | Xiong | G06Q 30/016 705/15 |

FOREIGN PATENT DOCUMENTS

| | | |
|---|---|---|
| JP | 2002-041770 | 2/2002 |
| JP | 2004-240600 | 8/2004 |
| JP | 2006-184946 | 7/2006 |
| JP | 2008-262362 | 10/2008 |
| JP | 2009-122871 | 6/2009 |
| JP | 2010-108166 | 5/2010 |

OTHER PUBLICATIONS

Office action in Japan Patent Application No. 2013-231069, dated Oct. 28, 2014.

* cited by examiner

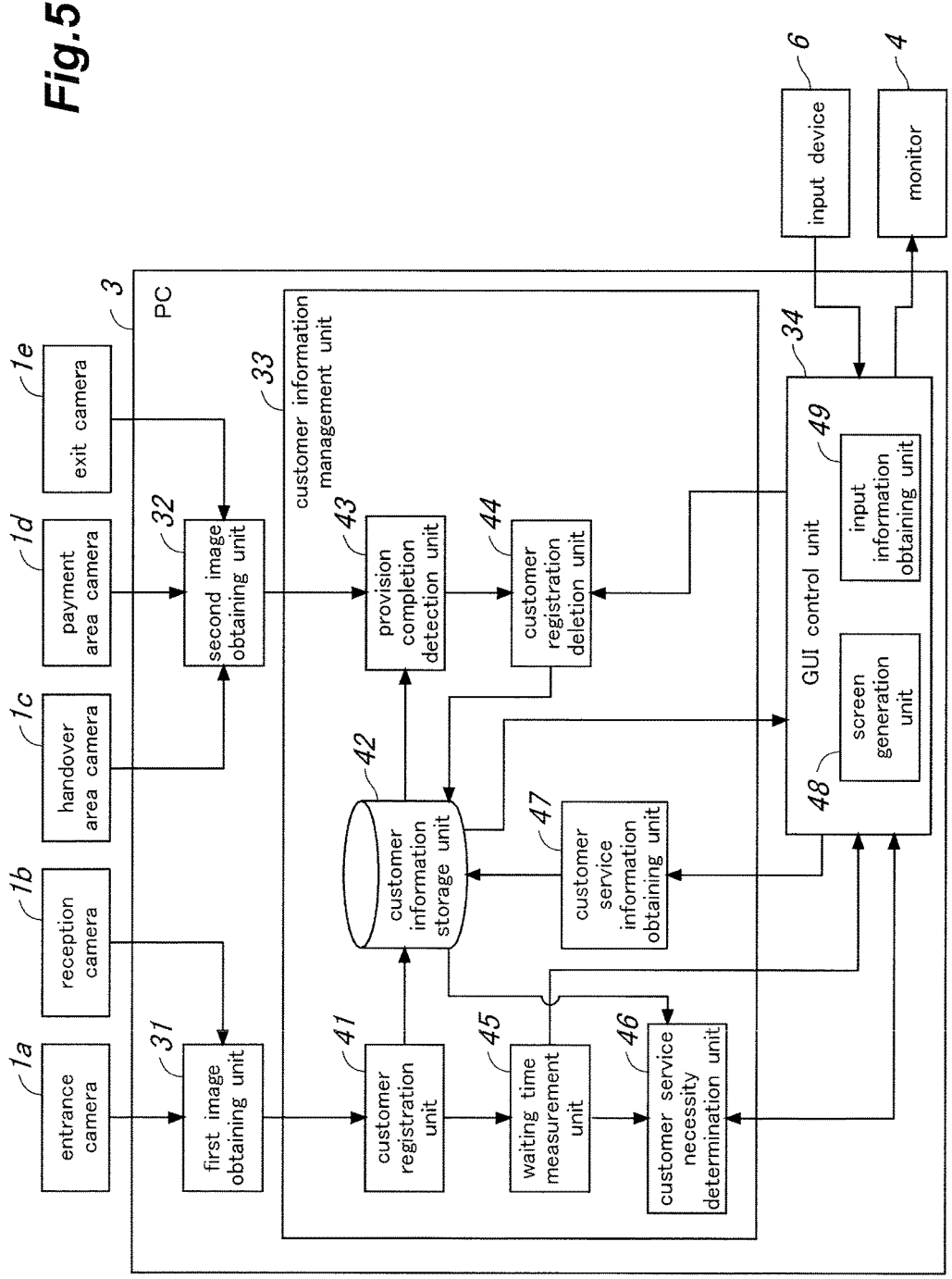

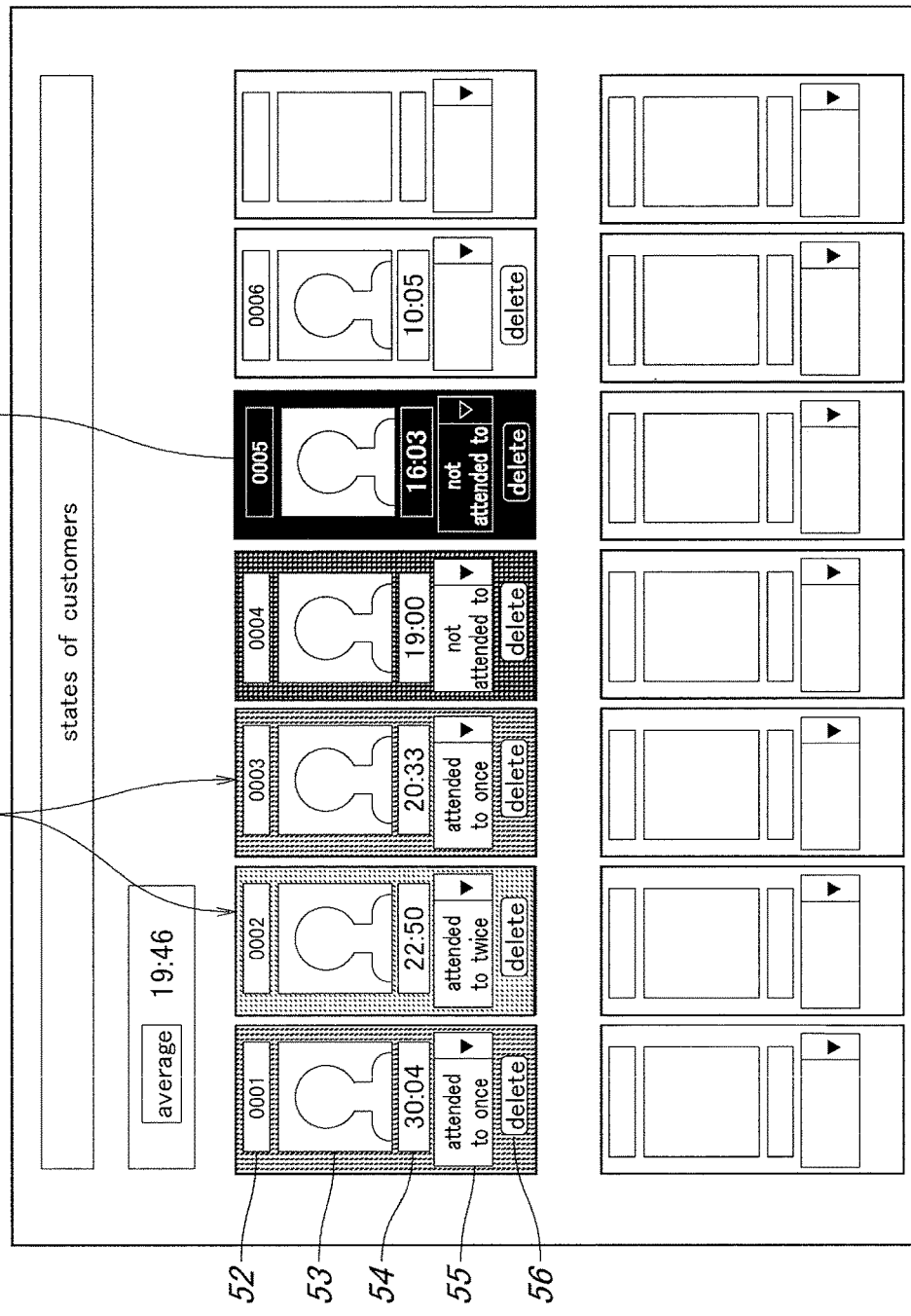

CUSTOMER MANAGEMENT DEVICE, CUSTOMER MANAGEMENT SYSTEM AND CUSTOMER MANAGEMENT METHOD

TECHNICAL FIELD

The present invention relates to a customer management device, a customer management system and a customer management method for managing the states of customers visiting a commercial establishment that provides articles or services to customers in response to the orders from the customers.

BACKGROUND OF THE INVENTION

In a commercial establishment that provides commercial items (hereinafter simply referred to as an item) to customers in response to the orders from the customers; namely, a commercial establishment that is selling items that need preparation, like a pharmacy selling prescription drugs, when the preparation of an item ordered by a customer is completed, the customer's name or number is called out and the item is handed over to the customer, and therefore, the customers need to wait in the waiting area until they are called. Thus, if customer information relating to the states of the customers who have entered the commercial establishment is generated and managed such that the customer information, particularly, the information necessary to provide customer service, such as the waiting time of each customer, is provided to the staff members, it is possible to provide appropriate customer service efficiently, and this is beneficial for improving the customer satisfaction and streamlining the operation of the commercial establishment.

With regard to such management of the states of the customers who have entered the commercial establishment, it is known conventionally to perform person matching between the images of persons captured when the persons enter the commercial establishment and the images of persons captured when the persons exit the commercial establishment, and when it is determined that a person entering the commercial establishment is identical with a person exiting the commercial establishment, to calculate, based on the time of capture of the image including the person entering the commercial establishment and the time of capture of the image including the person exiting the commercial establishment, an elapsed time from entering to exiting the commercial establishment as a stay duration (see JP07-249138A). It is also known to capture, with cameras, images of customers entering the commercial establishment, customers paying for their purchases and customers exiting the commercial establishment, collect face images extracted form the captured images, and perform person matching based on the face images to associate the images of a same person with one another, to thereby collect information relating to the behaviors of the customers (see JP2002-041770A). Further, a technology is known for displaying various information on a portable terminal device, where the information may include captured images of customers taking a queue ticket from a queue ticket dispensing machine, purposes of visits obtained from input operations performed by the customers at the queue ticket dispensing machine, waiting times of the customers calculated from the times of dispense of the queue ticket, and a state of performance of customer service behaviors (such as speaking to the customer) obtained from input operations performed on portable terminal devices carried by staff members who provide customer services (see JP2009-122871A).

However, the technology disclosed in the aforementioned JP07-249138A only makes it possible to grasp the waiting times of customers who are waiting for the handover of the items or the like in the commercial establishment, and the technology disclosed in JP2002-041770A only makes it possible to roughly grasp the behaviors of the customers, such as revisit of certain customers who have visited the commercial establishment before, based on the collected face images of the customers visiting the commercial establishment, and thus, they could not provide the staff members with sufficient information required for the staff members to provide appropriate customer services.

On the other hand, the technology disclosed in JP2009-122871A provides the staff members with information such as customer images, purposes of visits, waiting times and a state of performance of customer service behaviors (such as speaking to the customer), and thus, the staff members may be able to perform appropriate customer service behaviors based on such information. However, in a case where a customer makes an irregular behavior, such as temporarily exiting the commercial establishment to kill time outside the commercial establishment, the information provided by this technology is not sufficient to enable the staff members to provide appropriate customer services to such a customer.

The present invention is made to solve such prior art problems and a primary object of the present invention is to provide a customer management device, a customer management system and a customer management method which can grasp without fail the states of customers requiring a customer service behavior, to thereby improve the customer satisfaction.

SUMMARY OF THE INVENTION

To achieve the foregoing object, a first aspect of the present invention provides a customer management device for managing states of customers visiting a commercial establishment that provides articles or services to the customers in response to orders from the customers, the customer management device including: a processor; and a memory storing instructions, wherein the processor, when performing the instructions stored in the memory, includes: a first image obtainer that obtains customer images of customers captured at some point from when the customers enter the commercial establishment till when the customers go through reception procedures; a second image obtainer that obtains customer images of customers captured at least either when the customers receive the articles or services or when the customers make payment; a customer information manager that, based on the customer images obtained by the first image obtainer and the second image obtainer, generates and manages customer information relating to customers in a state of waiting for provision of the articles or services; and a customer information provider that provides a user with the customer information managed by the customer information manager.

According to this structure, it is possible to detect, based on the customer images obtained by the first image obtainer, customers who have entered the commercial establishment and/or gone through reception procedures, and to detect, based on the customer images obtained by the second image obtainer, customers who have actually received the articles or services, and by managing the customers by user of these customer images, it is possible to grasp without fail the states of the customers waiting for the provision of the articles or services, namely, the customers requiring a customer service behavior. Thereby, the user (such as a staff member) can perform a necessary customer service behavior to avoid a situation in which a customer is left unattended to till the provision of the articles or services, whereby the customer satisfaction can be improved.

In a second aspect of the present invention, the customer management device further includes: a third image obtainer that obtains customer images of customers exiting the commercial establishment; and an exiting detector that, based on the customer images at the time of exit from the commercial establishment obtained by the third image obtainer, detects that a customer in the state of waiting for provision of the articles or services has exited the commercial establishment, wherein the customer information provider provides the user with information indicating that a customer in the state of waiting for provision of the articles or services has exited the commercial establishment based on a result of detection by the exiting detector.

According to this structure, the user can know that a customer waiting for provision of the articles or services has exited the commercial establishment, and thus, it is possible to avoid unnecessarily calling the customer. In this case, it is possible to detect that a customer waiting for the provision of the articles or services has exited the commercial establishment by performing person matching between the customer images of the customers in the state of waiting for the provision of the articles or services and the customer images at the time of exit from the commercial establishment.

In a third aspect of the present invention, the first image obtainer obtains customer images at the time of entry into the store which are obtained by capturing images of customers entering the commercial establishment; the exiting detector detects, based on the customer images at the time of entry into the store obtained by the first image obtaining unit, that the customer who exited the commercial establishment in the state of waiting for the provision of the articles or services has returned to the commercial establishment; and the customer information provider provides the user with information indicating that the customer who exited the commercial establishment in the state of waiting for the provision of the articles or services has returned to the commercial establishment based on a result of detection by the exiting detector.

According to this structure, the user can know that the customer who exited the commercial establishment in the state of waiting for the provision of the articles or services has returned to the commercial establishment. Therefore, it is possible to perform calling of the customer promptly to hand over the articles or services to the customer. Further, it is possible to avoid a situation in which a customer who temporarily exited the commercial establishment is left unattended to. In this case, it is possible to detect that the customer who exited the commercial establishment in the state of waiting for the provision of the articles or services has returned to the commercial establishment by performing person matching between the customer images of the customers who exited the commercial establishment in the state of waiting for the provision of the articles or services and the customer images at the time of entry into the commercial establishment.

In a forth aspect of the present invention, the customer information provider generates display information relating to a customer state display screen in which the customer information of each of a plurality of customers is displayed in a list such that the customer state display screen is displayed on a display device; and in the customer state display screen, states of the plurality of customers are displayed such the customers are grouped into customers staying in the commercial establishment and customers who are out of the commercial establishment are customer.

According to this structure, the user can grasp separately the states of the customers staying in the commercial establishment and the states of the customers out of the commercial establishment, and thus, the user can provide an appropriate customer service easily.

In a fifth aspect of the present invention, the customer management device further includes a customer service necessity determiner that, based on the customer information, determines whether a customer service behavior is required to be performed for each customer, wherein, when it is determined by the customer service necessity determiner that the customer service behavior is required for a certain customer(s), the customer information provider notifies the user of the customer(s) for whom it is determined that the customer service behavior is required to be performed, to thereby prompt the customer service behavior.

According to this structure, the user can know the customer(s) requiring a customer service behavior, and thus, the user can perform an appropriate customer service behavior easily.

In a sixth aspect of the present invention, the customer management device further includes a waiting time measurer that measures, for each customer, a time period elapsed from a time of capture of the customer image obtained by the first image obtaining unit to a present time as a waiting time of the customer, wherein the customer service necessity determiner determines whether the customer service behavior is required to be performed based on the waiting time obtained by the waiting time measurer.

According to this structure, the user is allowed to perform a necessary customer service behavior, such as speaking to the customer to explain the current status and apologize for having the customer wait for a long time, at an appropriate timing.

In a seventh aspect of the present invention, the customer management device further includes a customer service information obtainer that obtains, based on an operation of an input unit by the user, customer service information relating to a customer(s) for whom the customer service behavior is not required to be performed, wherein based on the customer service information obtained by the customer service information obtainer, the customer service necessity determiner excludes the customer(s) for whom the customer service behavior is not required to be performed from customers for whom determination of whether the customer service behavior is required to be performed is to be made.

According to this structure, it is possible to prevent the customers for whom a customer service behavior is not required to be performed for a reason that cannot be detected by the customer service necessity determiner from being erroneously presented to the user as the customers requiring a customer service behavior. This can prevent the user from performing an unnecessary customer service behavior.

In an eighth aspect of the present invention, the customer management device further includes a customer service information obtainer that obtains, based on an operation of an input unit by the user, customer service information relating to a state of performance of a customer service behavior to the customers, wherein the customer information provider provides the user with the customer service information obtained by the customer service information obtainer.

According to this structure, the user is enabled to grasp the state of performance of the customer service behaviors, whereby the user can avoid performing an unnecessary customer service behavior.

In a ninth aspect of the present invention, the customer management device further includes: an order information obtainer that obtains order information relating to a content ordered by each customer at the time of reception; and a required preparation time estimator that, based on the order information obtained by the order information obtainer for each customer, estimates a required preparation time, which is a time period required from reception of the order from the customer to provision of the articles or services to the customer, wherein the customer information provider provides the user with the required preparation time for each customer estimated by the required preparation time estimator.

According to this structure, the user is enabled to grasp the required preparation time for each customer, and thus, can provide an appropriate customer service in accordance with the required preparation time.

In a tenth aspect of the present invention, the customer information provider generates display information relating to a customer state display screen in which the customer information for each of a plurality of customers is displayed in a list such that the customer state display screen is displayed on a display device; and in the customer state display screen states of the plurality of customers are displayed such that the customers are grouped depending on a length of the required preparation time.

According to this structure, the user is enabled to grasp the states of the customers for each of the groups defined depending on the length of the required preparation time, and thus, can provide an even more appropriate customer service.

In an eleventh aspect of the present invention, the customer information manager includes: a customer register that, when obtaining a customer image from the first image obtainer, registers a corresponding customer by use of the customer image; a provision completion detector that, based on person matching performed between the customer images obtained by the first image obtainer and the customer images obtained by the second image obtainer, detects that a customer is provided with the articles or services; and a customer registration deleter that, when the provision completion detector detects that a customer is provided with the article or service, deletes registration of the customer.

According to this structure, it is possible to grasp without fail the states of the customers waiting for the provision of the articles or services, namely, the customers requiring a customer service behavior, and in addition, since the customers for whom a customer service behavior is not required to be performed are excluded, it is possible to readily find the customers requiring a customer service behavior and to provide an appropriate customer service.

In a twelfth aspect of the present invention, there is provided a customer management system for managing states of customers visiting a commercial establishment that provides articles or services to the customers in response to orders from the customers, the system including: a camera mounted in the commercial establishment; and a plurality of information processing devices, wherein the plurality of information processing devices jointly include: a first image obtainer that obtains customer images of customers captured with the camera at some point from when the customers enter the commercial establishment till when the customers go through reception procedures; a second image obtainer that obtains customer images of customers captured with the camera at least either when the customers receive the articles or services or when the customers make payment; a customer information manager that, based on the customer images obtained by the first image obtainer and the second image obtainer, generates and manages customer information relating to customers in a state of waiting for provision of the articles or services; and a customer information provider that provides a user with the customer information managed by the customer information manager.

According to this structure, similarly to the structure according to the first aspect of the present invention, it is possible to grasp without fail the states of the customers requiring a customer service behavior and improve the customer satisfaction.

In a thirteenth aspect of the present invention, there is provided a customer management method for performing, with an information processing device, a process of managing states of customers visiting a commercial establishment that provides articles or services to the customers in response to orders from the customers, the method including: obtaining customer images of customers captured at some point from when the customers enter the commercial establishment till when the customers go through reception procedures; obtaining customer images of customers captured at least either when the customers receive the articles or services or when the customers make payment; based on the customer images obtained, generating and managing customer information relating to customers in a state of waiting for provision of the articles or services; and providing a user with the customer information, wherein at least one of the obtaining customer images of customers captured at some point from when the customers enter the commercial establishment till when the customers go through reception procedures, the obtaining customer images of customers captured at least either when the customers receive the articles or services or when the customers make payment, the generating and managing customer information, and the providing the customer information is performed by a processor.

According to this structure, similarly to the structure according to the first aspect of the present invention, it is possible to grasp without fail the states of the customers requiring a customer service behavior and improve the customer satisfaction.

BRIEF DESCRIPTION OF THE DRAWINGS

Now the present invention is described in the following in terms of preferred embodiments thereof with reference to the appended drawings, in which:

FIG. 5 is a block diagram schematically showing a functional structure of the PC 3;

FIG. 6 is an explanatory diagram showing an example of a customer state display screen shown on a monitor 4;

DETAILED DESCRIPTION OF THE PREFERRED EMBODIMENTS

In the following, embodiments of the present invention will be described with reference to the drawings.

First Embodiment

Figure 1:
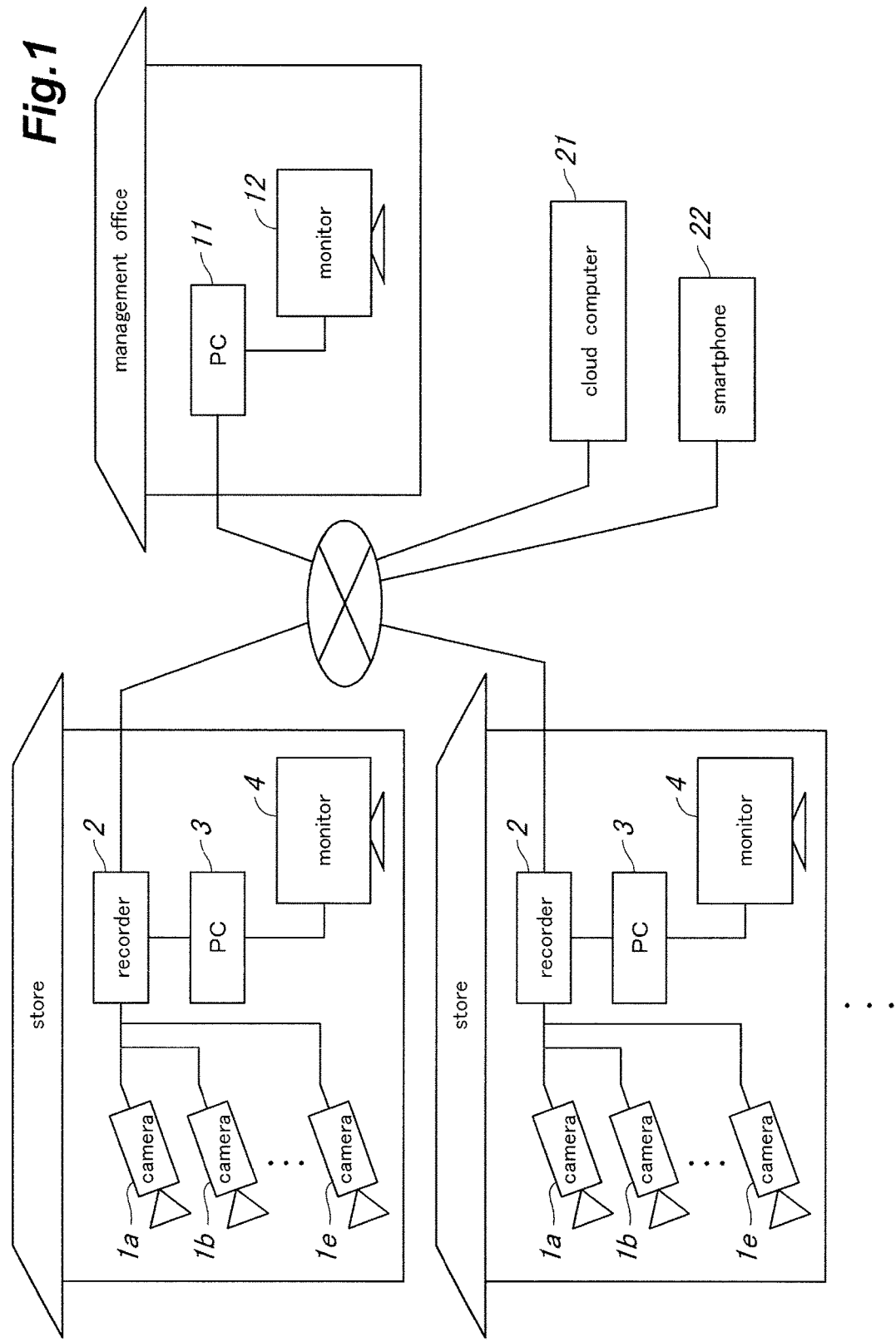
FIG. 1 is a diagram showing an overall structure of a customer management system according to the first embodiment of the present invention.

FIG. 1 is a diagram showing an overall structure of a customer management system according to the first embodiment of the present invention. This customer management system is designed for a chain of stores such as pharmacies selling prescription drugs, for example, and includes cameras (imaging devices) 1a to 1e, a recorder (image recording device) 2, a personal computer (PC) (customer management device) 3 and a monitor (display device) 4, which are set up at each of the stores within the chain. Further, the customer management system includes a PC 11 and a monitor 12, which are set up at a management office overseeing the multiple stores.

The cameras 1a to 1e are mounted at mounted at appropriate positions in each store to capture images of various areas in the store, and image information obtained thereby is recorded by the recorder 2. The PC 3 set up at the store and the PC 11 set up at the management office can display the real-time images of various areas in the store captured by the cameras 1a to 1e or the past images of various areas in the store recorded by the recorder 2, and this allows a user at the store or the management office to check the situation in the store.

The PC 3 set up at the store is configured to realize a customer management device that manages the states of customers visiting the store. The customer information generated by the PC 3 set up at the store can be displayed on the PC 3 itself, and also is transmitted to the PC 11 set up at the management office, such that the information can be displayed on the PC 11. Thus, the PCs 3 and 11 are each configured to serve as a browser device that allows a user to view the customer information.

Figure 2:
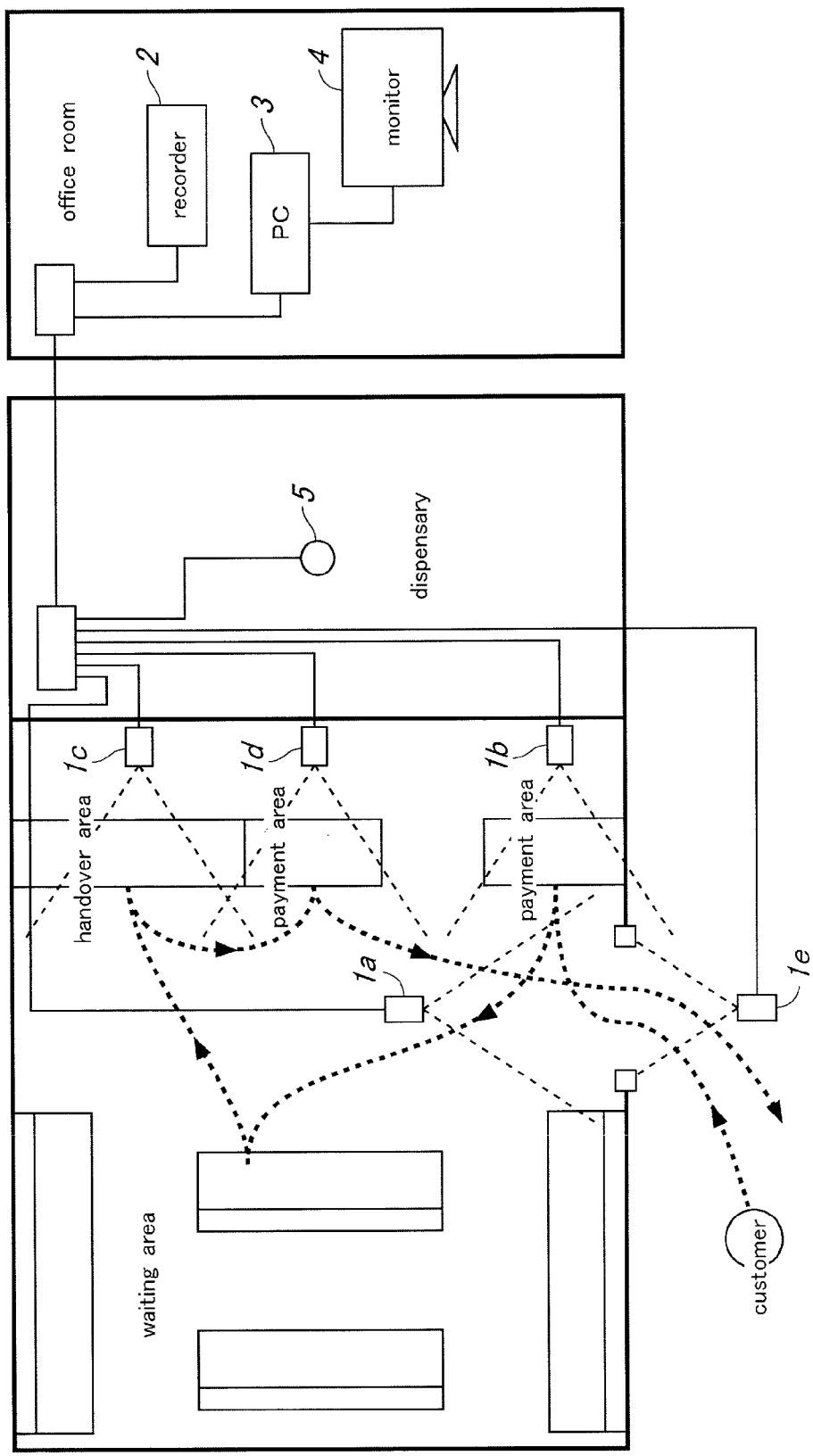
FIG. 2 is a plan view for explaining an interior layout of a store, arrangement of cameras 1*a* to 1*e* and states of customers.

Next, taking a pharmacy selling prescription drugs as an example, a description will be given of an interior layout of the store, arrangement of the cameras 1a to 1e and states of customers. FIG. 2 is a plan view for explaining an interior layout of the store, arrangement of the cameras 1a to 1e and states of customers.

The store includes an entrance/exit, a reception area, a handover area, a payment area, a waiting area, a dispensary, and an office room. When a customer walks in through the entrance/exit, the customer first goes through reception procedures at the reception area; specifically, presents the prescription and orders an item(s) (medicine). The customer who has gone through the reception procedures waits in the waiting area until he/she is called. When the preparation of the ordered item (preparation of medicine) is completed and the customer is called, the customer receives the item at the handover area after being given an explanation about the item (pharmacist's directions for taking medicine) from a store staff member. Then, the customer makes payment for the item at the payment area. After the payment, the customer exits the store through the entrance/exit.

The multiple cameras 1a to 1e are mounted in the store to capture the images of customers visiting the store. Specifically, in the present embodiment, arranged are an entrance camera 1a that captures images of customers entering the store through the entrance/exit, a reception camera 1b that captures images of customers going through reception procedures at the reception area, a handover area camera 1c that captures images of customers receiving the items at the handover area, a payment area camera 1d that captures images of customers making payment at the payment area, and an exit camera 1e that captures images of customers exiting the store through entrance/exit. These cameras 1a to 1e are each mounted to capture the face of the customers from the front.

It is to be noted that in the present embodiment, the customers enter and exit the store through a single entrance/exit, but the store may include a separate entrance and exit. In this case, the entrance camera 1a and the exit camera 1e are mounted at the entrance and exit, respectively. Further, in the present embodiment, the customers receive the items before making payment therefor, but the handover of the items to the customers and the payment by the customers therefor may be performed in the reverse order. Further, though the configuration is made such that the handover area camera 1c and the payment area camera 1d are separately mounted, in some stores the handover and payment may be performed simultaneously in a predetermined area, and in such a case, a single camera may be used to take the images of the customers in the predetermined area.

In a store that provides items to customers in response to the orders from the customers as described in the foregoing, the customers may have to wait for a long time until the ordered items become available and they are notified of it by calling, and this would make the customers frustrated. To solve such a problem, in the present embodiment, the states of the customers who have entered are managed by the PC 3; particularly, the waiting time of each customer is measured, to allow the store staff to perform necessary customer service behaviors, such as speaking to the customers who have been waiting for a long time to explain the status and apologize for having them wait for a long time, to thereby improve the customer satisfaction. In the following, a description will be given of the customer management process performed by the PC 3.

It is to be noted that an omnidirectional camera 5 is mounted in the dispensary. By detecting the movement lines of persons such as a pharmacist working in the dispensary from the images captured by the omnidirectional camera 5, it is possible to analyze the efficiency of work in the dispensary or the like.

Next, a description will be given of an overview of the customer management process performed by the PC 3 shown in FIG. 1. FIGS. 3A and 3B and FIGS. 4A and 4B are explanatory diagrams for explaining the overview of the customer management process performed by the PC 3.

Figure 3A:
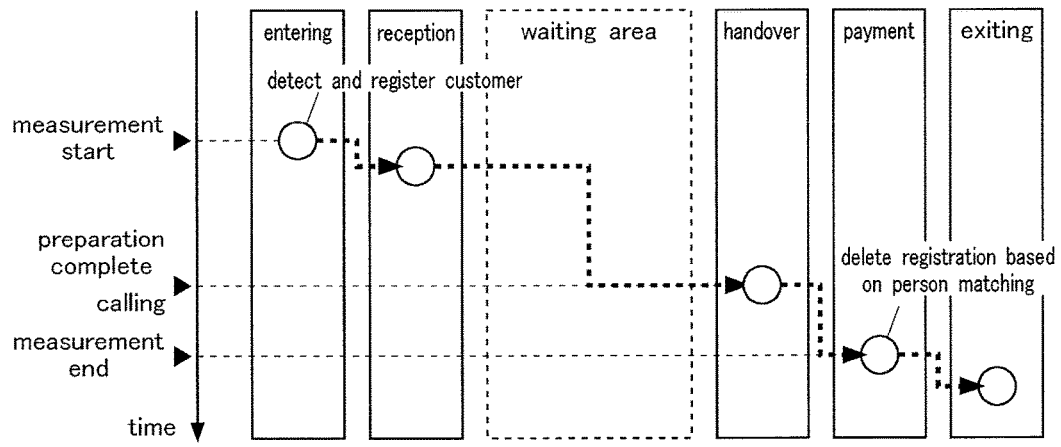
FIGS. 3A and 3B and FIGS. 4A and 4B are explanatory diagrams for explaining an overview of a customer management process performed by a personal computer (PC) 3.

As shown in FIG. 3A, when a person (customer) enters the store through the entrance/exit of the store, the image of the person is captured by the entrance camera 1a, and the person detected in the captured image is registered as a customer and the measurement of the waiting time of the customer is started. Then, the customer who has entered the store goes through reception procedures at the reception area, and the image of the customer at the reception area is captured by the reception camera 1b. The customer who has completed the reception procedures waits in the waiting area for his/her name or number being called. When the preparation of the item by the store is completed and the customer is notified of it by calling, the customer receives the item at the handover area, and the image of the customer at that time is captured by the handover area camera 1c. Thereafter, the customer makes payment at the payment area, and the image of the customer during payment is captured by the payment area camera 1d. At this time, person matching is performed between the registered customer images, namely, the customer images obtained at the time of entry into the store and the customer image obtained at the time of payment, such that the registration of the customer for whom the matching was successful is deleted, and then, the measurement of the waiting time ends. The customer who has made payment exits the store through the entrance/exit, and the image of the customer exiting the store is captured by the exit camera 1e.

Figure 3B:
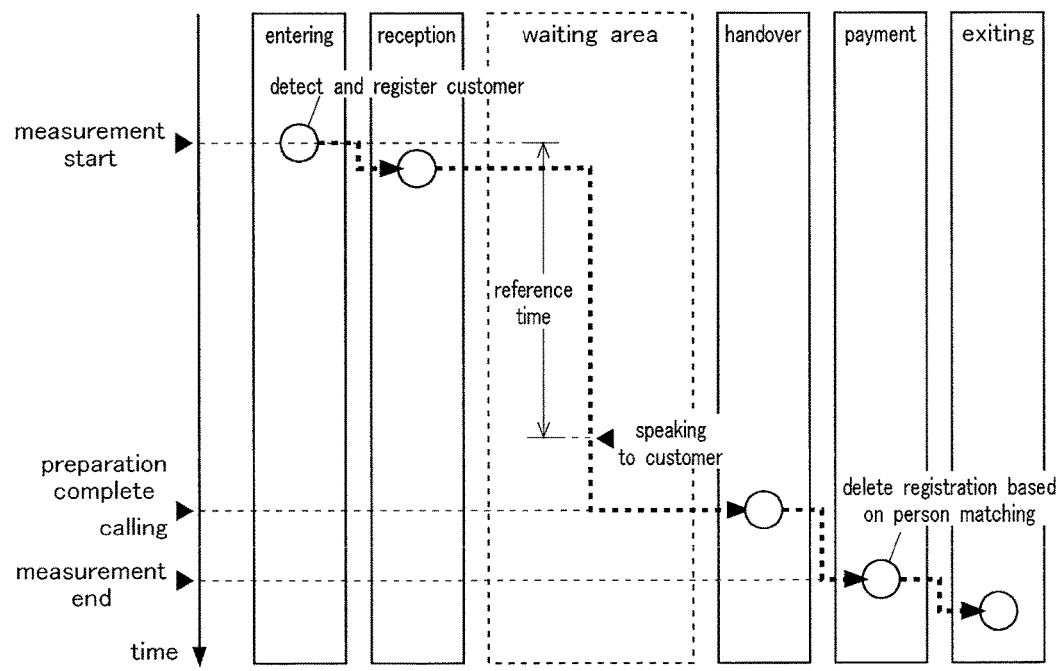

As shown in FIG. 3B, when the waiting time of a customer, which is measured from the entry of the customer into the store, becomes long such that the waiting time exceeds a reference time, a notification is made to a staff member to prompt a customer service behavior, and in response thereto, the staff member finds out the customer in question from among the customers staying in the waiting area and performs a necessary customer service for the customer, such as speaking to the customer to explain the current status and apologize for having the customer wait for a long time.

Figure 4A:
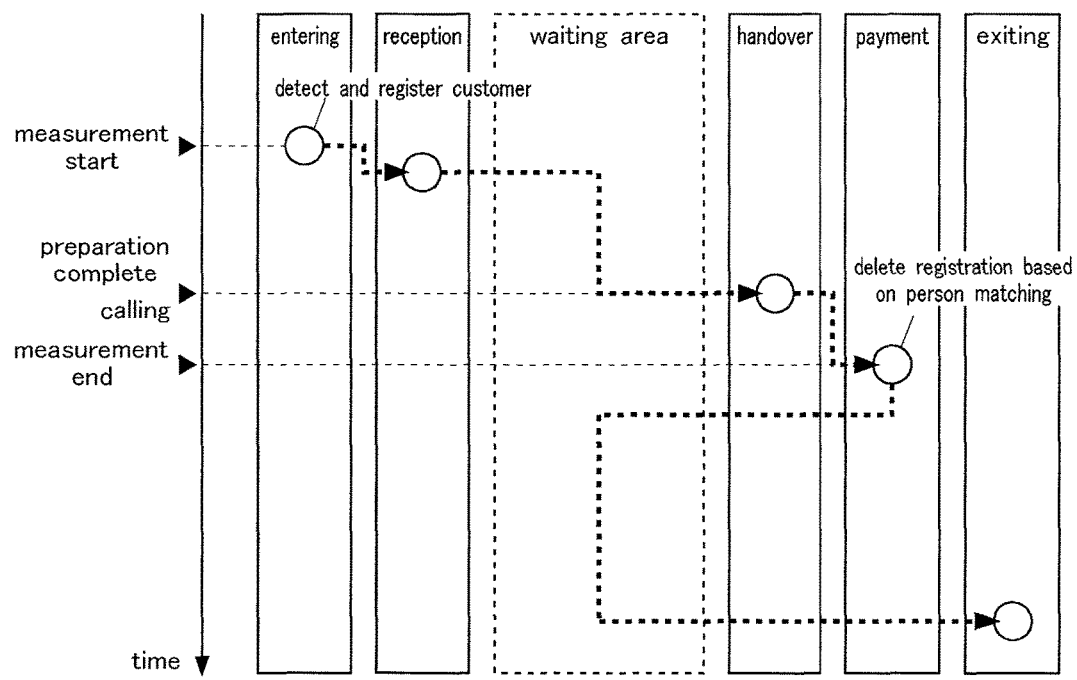

As shown in FIG. 4A, in some cases, a customer does not exit the store immediately after payment but stays in the waiting area for a reason such as waiting for a car to pick him/her up or just killing time. In the case of such a customer, if the customer stays in the waiting area for a long time, it is not necessary to perform a customer service behavior for the customer, and thus, the customer should be excluded from the customers to be monitored to determine whether customer service is required. In the present embodiment, when a customer has made payment, the registration of the customer is deleted and the customer is excluded automatically from the customers to be monitored to determine whether customer service is required, and this can avoid making a notification to the staff member for prompting a customer service behavior for the customer.

Figure 4B:
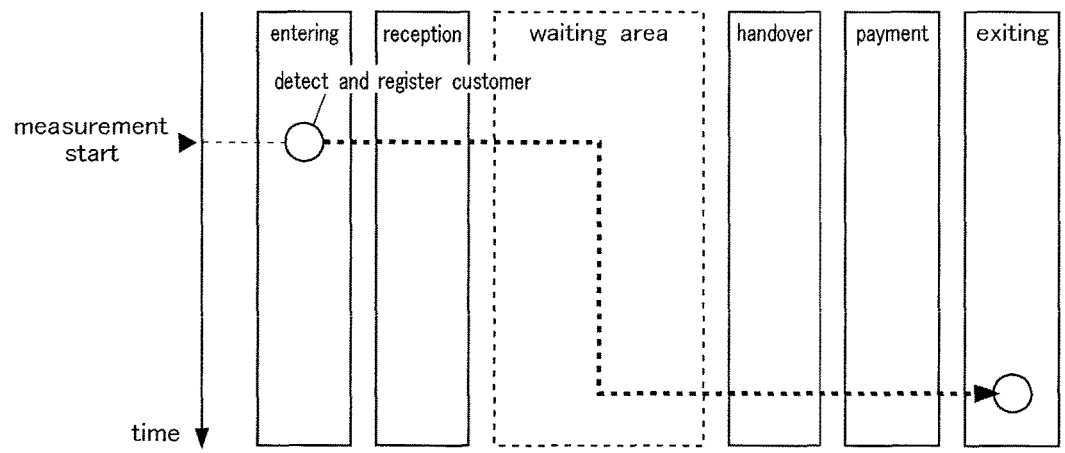

Further, as shown in FIG. 4B, in a case where a person accompanying a customer (accompanying person) enters the store with the customer, the accompanying person stays in the waiting area and exits the store together with the customer after payment. In such a case, it is sufficient to perform a customer service behavior for the customer and unnecessary to perform a customer service behavior for the accompanying person, and therefore, the accompany person should be excluded from the customers to be monitored to determine whether customer service is required. In the present embodiment, when a person who has been registered as a customer is determined to be an accompanying person, the staff member deletes the registration manually.

Next, the customer management process performed by the PC 3 shown in FIG. 1 will be described more in detail. FIG. 5 is a block diagram schematically showing a functional structure of the PC 3.

The PC 3 includes a first image obtaining unit 31, a second image obtaining unit 32, a customer information management unit 33 and a GUI control unit (information provider) 34.

The first image obtaining unit 31 obtains customer images of customers captured at some point from when the customers enter the store till when the customers go through reception procedures. Specifically, in the present embodiment, the first image obtaining unit 31 obtains customer images at the time of entry into the store which are generated by capturing, with the entrance camera 1a, images of customers entering the store through the entrance/exit and customer images at the time of reception which are generated by capturing, with the reception camera 1b, images of customers going through reception procedures.

The second image obtaining unit 32 obtains customer images of customers captured at least either when the customers receive items or when the customers make payment. Specifically, in the present embodiment, the second image obtaining unit 32 obtains customer images at the time of handover generated by capturing, with the handover area camera 1c, images of customers receiving items, customer images at the time of payment generated by capturing, with the payment area camera 1d, images of customers making payment, and customer images at the time of exit from the store generated by capturing, with the exit camera 1e, images of customers exiting the store through the entrance/exit.

The first image obtaining unit 31 and the second image obtaining unit 32 each perform a person detection process to detect persons from the captured images input from the relevant cameras 1a to 1e and an image processing to cut out an image of a face area of each person detected by the person detection process (face image) from the captured images, and the face images are output as the customer images.

The customer information management unit 33 generates and manages customer information relating to the customers waiting for the provision of items based on the customer images obtained by the first image obtaining unit 31 and the second image obtaining unit 32. The customer information management unit 33 includes a customer registration unit 41, a customer information storage unit 42, a provision completion detection unit 43, a customer registration deletion unit 44, a waiting time measurement unit 45, a customer service necessity determination unit 46 and a customer service information obtaining unit 47.

The customer registration unit 41 performs a process of when obtaining a customer image at the time of entry into the store from the first image obtaining unit 31, generating new customer information relating to the person included in the customer image and registering the person as a customer. In this customer registration process, a serial number is assigned to the customer in the order of entry into the store, and customer information including the customer image and serial number is generated. The customer information generated by the customer registration process is cumulatively stored in the customer information storage unit 42. It is to be noted that the customer information includes information other than the customer image and serial number, such as a time of capture of the customer image at the time of entry into the store, namely, an entry time into the store.

To avoid registering a staff member as a customer, a process of registering the staff members is performed in advance by the customer registration unit 41 using the images of the staff members (staff member images), whereby a person entering the store is registered as a customer only when the person is determined not to be a staff member. In this staff exclusion process, determination of whether a person entering the store is a staff member may be made by performing person matching between the customer image of the person obtained by the first image obtaining unit 31 and each of the staff member images (namely, matching the customer image of the person obtained by the first image obtaining unit 31 against the staff member images).

It is to be noted that in the present embodiment, the entrance camera 1*a* and the reception camera 1*b* are provided and the first image obtaining unit 31 is configured to obtain the customer images at the time of entry into the store and the customer images at the time of reception, but it is possible to provide either one of the entrance camera 1*a* and the reception camera 1*b*, such that the first image obtaining unit 31 obtains either one of the customer images at the time of entry into the store and the customer images at the time of reception.

Further, in the present embodiment, the customer registration unit 41 performs registration of customers using the customer images at the time of entry into the store, but the registration of customers may be performed using the customer images at the time of reception. In the case where the customer registration is performed using the customer images at the time of entry into the store, every customer visiting the store is registered, and therefore, customer service behaviors can be performed for every customer in need of customer service. On the other hand, in the case where the customer registration is performed using the customer images at the time of reception, an accompanying person, who does not go through reception procedures, is not registered, and thus, the process of excluding the accompanying person from the customers to be monitored to determine whether customer service is required can be omitted. Further, in the case where both the customer images at the time of entry into the store and the customer images at the time of reception are obtained, it is possible to identify accompanying persons based on these customer images.

In the present embodiment, person matching between two images (or re-identification of a person between two images or camera views) is performed as appropriate. In this person matching, any known person recognition technique may be used; for example, it is possible to determine whether a person included in one image is the same as a person in another image by comparing feature quantity data extracted from the one image with feature quantity data extracted from the other image. It is not necessarily required to obtain feature quantity data from the images every time person matching is performed; namely, if the feature quantity data has been already obtained for certain images, the already-obtained feature quantity data may be used when person matching is performed with regard to these images.

The provision completion detection unit 43 performs a process of detecting customers who have been provided with (or handed over) items by performing person matching between the customer images at the time of payment obtained by the second image obtaining unit 32 and the customer images at the time of entry into the store which have been obtained by the first image obtaining unit 31 and stored in the customer information storage unit 42 as the customer information. In this provision completion detection process, if the person matching between a customer image at the time of entry into the store and a customer image at the time of payment is successful, namely, if it is determined that persons included in these customer images are the same person, it is determined that the registered customer relating to the customer image at the time of entry into the store has received the item.

It is to be noted that in the present embodiment, the handover area camera 1*c*, the payment area camera 1*d* and the exit camera 1*e* are provided and the second image obtaining unit 32 is configured to obtain the customer images at the time of handover, customer images at the time of payment and customer images at the time of exit from the store, but it is possible to provide either one of the handover area camera 1*c* and the payment area camera 1*d*, such that the second image obtaining unit 32 obtains either one of the customer images at the time of handover and the customer images at the time of payment.

Further, in the present embodiment, the provision completion detection unit 43 performs person matching between the customer image of each customer at the time of payment and each of the customer images of customers at the time of entry into the store, but it is also possible to use the customer image of each customer at the time of handover instead of the customer image at the time of payment.

The customer registration deletion unit 44 performs a process of deleting the registration of a customer when it is detected by the provision completion detection unit 43 that the customer has received an item. Particularly, in the present embodiment, the customer information of the registered customers, namely, the customers waiting for the provision of items is provided to the store staff, and the customer information of the customer whose registration has been deleted is removed from the information to be provided to the store staff. It is also possible to delete the customer information of the customer whose registration has been deleted from the customer information storage unit 42, though it may be left as a record. In the case where the customer information of the customer whose registration has been deleted is to be used as a record, the customer information should be left in a form that protects the privacy.

The waiting time measurement unit 45 performs, for each customer, a process of measuring, as a waiting time, an elapsed time from the time of capture of the customer image at the time of entry into the store obtained by the first image obtaining unit 31, namely, the entry time into the store, to the current time. This waiting time measurement process is continued until the provision completion detection unit 43 detects that the customer has received an item and the registration of the customer is deleted.

The customer service necessity determination unit 46 performs a process of determining, based on the waiting time of each customer obtained by the waiting time measurement unit 45, the necessity of a customer service behavior that should be performed for a customer whose waiting time is long, namely, speaking to the customer to explain the current status and apologize for having the customer wait for a long time is necessary. In this customer service necessity determination process, the waiting time is compared with a predetermined reference time, and it is determined that a customer service behavior is required to be performed when the waiting time exceeds the reference time.

Further, the customer service necessity determination unit 46 performs a process of determining the necessity of a customer service behavior that should be performed when the order of calling of the customers is changed, namely, speaking to the customer who is moved down in the order of calling (or handing of the item) to apologize for his/her tern of handover of the item being skipped. In this customer service necessity determination process, it is determined whether there is a customer who entered the store earlier than the customer for whom calling is to be performed in accordance with an input operation made by a staff member, namely, whether a customer assigned a serial number lower than that assigned to the customer for whom calling is to be performed still remains in the store, and if such a customer still remains in the store, it is determined that a customer service behavior is required to be performed.

The customer service information obtaining unit 47 obtains customer service information from the staff member. Specifically, the customer service information obtaining unit 47 performs a process of obtaining, through the GUI control unit 34, customer service information relating to the state of performance of the customer service behaviors by the store staff and customer service information relating to the customers for whom it is not necessary to perform a customer service behavior.

The pieces of information obtained by the various units in the customer information management unit 33 are cumulatively stored in the customer information storage unit 42 as the customer information of respective customers.

The GUI control unit 34 provides, through GUI (Graphical User Interface) using the monitor and an input device (input unit) 6 such as a mouse, presents the customer information generated and managed by the customer information management unit 33 to the staff member, and includes a screen generation unit 48 and an input information obtaining unit 49. The screen generation unit 48 performs a process of generating display information relating to customer state display screen for displaying pieces of customer information of the registered customers in a list, such that the customer state display screen is displayed on the monitor 4. The input information obtaining unit 49 performs a process of obtaining input information in accordance with input operations made by the staff member on the customer state display screen with the input device 6.

As will be described in detail later, in the customer state display screen generated by the screen generation unit 48, the customer information including the customer images stored in the customer information storage unit 42 and the waiting time of each customer obtained by the waiting time measurement unit 45 are displayed. Further, when it is determined by the customer service necessity determination unit 46 that a customer service behavior is required to be performed, a notification that prompts the customer service behavior is displayed. The input information obtained by the input information obtaining unit 49 in accordance with input operations performed by the staff member on the customer state display screen is sent to the customer service information obtaining unit 47.

It is to be noted that the various units of the PC 3 shown in FIG. 5 are realized by executing programs for customer management by the CPU of the PC 3. These programs may be pre-installed in the PC 3 serving as an information processing device to embody a device dedicated to customer management, or may be provided to a user in the form stored in an appropriate program recording medium as an application program that can be run on a general-purpose OS or via a network.

Figure 7A:
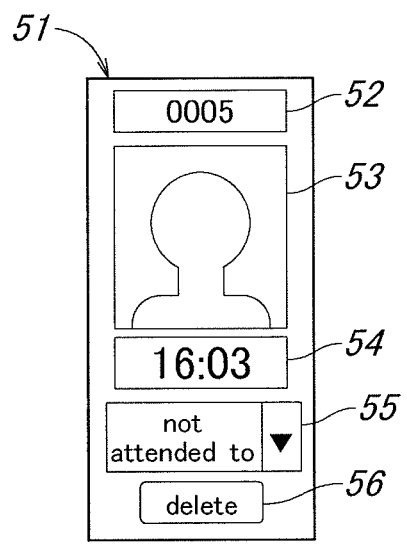
FIGS. 7A and 7B are explanatory diagrams showing a part of the customer state display screen shown in FIG. 6.
Figure 7B:
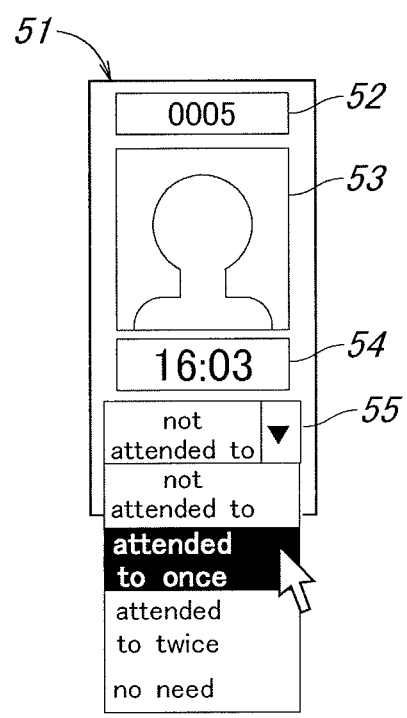

Next, a description will be given of the customer state display screen displayed on the monitor 4 shown in FIG. 5. FIG. 6 is an explanatory diagram showing an example of the customer state display screen displayed on the monitor 4. FIGS. 7A and 7B are explanatory diagrams showing a part of the customer state display screen shown in FIG. 6.

The screen generation unit 48 of the GUI control unit 34 shown in FIG. 5 performs a process of generating display information relating to the customer state display screen in which pieces of customer information of the registered customers, i.e., customers waiting for the provision of items, are displayed in a list, such that the customer state display screen as shown in FIG. 6 is displayed on the monitor 4.

In this customer state display screen, customer information display parts 51 displaying the customer information of respective customers are arranged in vertical and horizontal directions. Further, in this customer state display screen, an average waiting time obtained by averaging all customers' waiting times is displayed.

As shown in FIG. 7A, each customer information display part 51 includes a serial number display part 52, a customer image display part 53, a waiting time display part 54, a customer service information input/display part 55 and a delete button (deletion operation part) 56. The serial number display part 52 displays the serial number assigned to the customer in the order of entry into the store at the time of registration by the customer registration unit 41. The customer image display part 53 displays the face image of the customer registered by the customer registration unit 41. The waiting time display part 54 displays the waiting time obtained by the waiting time measurement unit 45.

The customer service information input/display part 55 allows the staff member to input the state of performance of the customer service behaviors performed by the staff member, namely, the customer service behaviors actually performed by the staff member, and displays the state of performance of the customer service behaviors in accordance with the content of input.

Specifically, as shown in FIG. 7B, when the customer service information input/display part 55 is operated, a pull-down menu containing selection items "not attended to," "attended to once," "attended to twice" and "no need" is displayed. In an initial state, the customer service information input/display part 55 displays "not attended to." When the customer service behavior is performed for the first time, "attended to once" is selected, and when the customer service behavior is performed for the second time, "attended to twice" is selected. In a case where it is found from a customer service behavior actually performed by the staff member or from any other events that the customer actually is an accompanying person or that the customer is staying in the waiting area for a reason other than waiting for the handover of an item, it is determined that it is not necessary to perform a customer service behavior for the customer, and accordingly, "no need" is selected. In response to this selection operation, the text displayed in the customer service information input/display part 55 is changed.

The customer for whom "no need" is selected in the customer service information input/display part 55 is excluded from the customers for whom the customer service necessity determination process is to be performed by the customer service necessity determination unit 46, and accordingly, the notification of the waiting time exceeding a predetermined time and the notification of a change in the order of calling of the customers are not performed for this customer.

As shown in FIG. 7A, the delete button 56 is to be operated to manually delete the registration of the customer. When the delete button 56 of one customer information display part 51 is operated, the customer registration deletion unit 44 performs the process of deleting the registration of the relevant customer and the customer information display part 51 is deleted from the customer state display screen. The cases where the registration of the customer should be deleted manually by operating the delete button 56 may include a case where the customer is excluded from the customers to be monitored to determine whether a customer service behavior is required (namely, the customer actually is an accompanying person or the like for which it is not necessary to perform a customer service behavior), a case where the same person is registered as two or more different customers for some erroneous processing, and a case where a staff member is registered as a customer due to failure to register the staff member as not a customer beforehand.

In view of the possibility of an erroneous operation of the delete button 56, it will be preferred if, upon operation of the delete button 56, a confirmation screen is displayed in a pop-up window, and when an OK button is operated in the confirmation screen, the deletion is executed. It is also possible to permit the deletion of the registration of the customer for whom "no need" is selected in the customer service information input/display part 55.

It is to be noted that for the customer with regard to whom completion of handover is detected by the provision completion detection unit 43 based on the person matching, the customer registration deletion unit 44 automatically performs the registration deletion process, and the customer information display part 51 of this customer is deleted from the customer state display screen.

Further, in the customer state display screen shown in FIG. 6, to notify the staff member of a customer whose waiting time has exceeded the reference time and for whom it is determined by the customer service necessity determination unit 46 that a customer service behavior, specifically, speaking to the customer to explain the current status and apologize for having him/her wait for a long time, is necessary, the customer information display part 51 of this customer is highlighted. Particularly, in the illustrated embodiment, the customer information display part 51 is displayed with white letters on colored (e.g., black) background. Instead of displaying the customer information display part 51 with white letters on colored background, it is possible to change the display color of the customer information display part 51. It is also possible to display a pop-up window to show a message therein prompting a customer service behavior.

Further, in the customer state display screen shown in FIG. 6, depending on the content of input according to an operation of the customer service information input/display part 55 shown in FIG. 7B (i.e., "not attended to," "attended to once," "attended to twice" and "no need"), the display color of the customer information display part 51 is changed together with the displayed text in the customer service information input/display part 55.

Further, in a case where the preparation of an item is completed and the customer is called, when the customer is selected in the customer state display screen shown in FIG. 6, for example, the customer image display part 53 of the customer information display part 51 relating to the customer is selected, the customer service necessity determination unit 46 determines whether the order of calling has been changed; specifically, whether a customer assigned a serial number lower than that assigned to the customer for whom calling is to be performed still remains in the store, and if it is determined that such a customer is in the store, an indication for notifying it to the staff member is displayed in the customer state display screen. This indication may be achieved by highlighting the customer information display part 51 relating to the customer in question, such as displaying the customer information display part 51 with white letters on black background or changing the color of the same. Alternatively or in addition, it is possible to display a pop-up window including a message that the order of calling has been changed.

As described in the foregoing, in the present embodiment, it is possible to detect, based on the customer images obtained by the first image obtaining unit 31, customers who have entered the store and/or gone through reception procedures, and to detect, based on the customer images obtained by the second image obtaining unit 32, customers who have actually received items, and by managing the customers by use of these customer images, it is possible to grasp without fail the states of the customers waiting for the provision of items, namely, the customers requiring a customer service behavior. Thereby, the staff member can perform a necessary customer service behavior to avoid a situation in which a customer is left unattended to till the provision of the item, whereby the customer satisfaction can be improved.

Further, in the present embodiment, it is determined whether a customer service behavior is required for each customer, and a notification is made to the staff member of the customer(s) requiring a customer service behavior, enabling the staff member to know the customer(s) requiring a customer service behavior. Thus, the staff member can perform an appropriate customer service behavior easily.

Further, in the present embodiment, the waiting time of each customer is measured and it is determined based on the waiting time whether a customer service behavior is necessary. This allows the staff member to perform a necessary customer service behavior, such as speaking to the customer to explain the current status and apologize for having the customer wait for a long time, at an appropriate timing. Further, in the present embodiment, the waiting time itself is presented to the staff member such that the staff member can grasp the waiting time of each customer, and therefore, the staff member can perform an appropriate customer service behavior based on his/her own decision.

Further, in the present embodiment, the staff member is enabled to perform an input operation for designating the customer(s) for whom a customer service behavior is not required to be performed, and the designated customers are excluded from the customers for whom the customer service behavior necessity determination is to be performed by the customer service necessity determination unit 46. Therefore, it is possible to prevent the customers for whom a customer service behavior is not required to be performed for a reason that cannot be detected by the customer service necessity determination unit 46 from being erroneously presented to the staff member as the customers requiring a customer service behavior. This can prevent the staff member from performing an unnecessary customer service behavior, to thereby improve the work efficiency of the staff member.

Further, in the present embodiment, the staff member is enabled to input the state of performance of the customer service behaviors by the staff member, and the state of performance of the customer service behaviors is presented to the staff member, and thus, the staff member can grasp the state of performance of the customer service behaviors, whereby the staff member can avoid performing an unnecessary customer service behavior and the work efficiency of the staff member is improved.

Further, in the present embodiment, the customers are registered using the customer images at the time of entry into the store, and customers who have received items are detected by performing person matching between the customer images at the time of entry into the store and the customer images at the time of payment to thereby delete the registration of the detected customers. Therefore, it is possible to grasp without fail the states of the customers waiting for the provision of items, namely, the customers requiring a customer service behavior, and in addition, since the customers for whom a customer service behavior is not required to be performed are excluded, it is possible to readily find the customers requiring a customer service behavior and to provide appropriate customer services.

Further, in the present embodiment, information such as the waiting time and the state of performance of the customer service behaviors is presented to the user (or staff member) in association with the respective customer images, and thus, based on the customer images presented, the staff member can visually find the customer in question easily from among the customers waiting in the store for the provision of items, and further, the staff member can perform an appropriate customer service behavior correctly.

Further, in the present embodiment, a notification that the order of calling has been changed is made, whereby the staff member can perform an appropriate customer service behavior, such as speaking to the customer who is moved down in the order of calling to apologize for his/her handover of the item being put off. Thereby, it is possible to reduce the customer frustration due to a change in the order of calling.

Second Embodiment

Next, a description will be given of a customer management system according to the second embodiment. The features in the second embodiment that are not specifically described in the following are the same as those in first embodiment described above.

In a store that provides items to customers in response to the orders from the customers, some customers who have entered the store and gone through reception procedures may exit the store temporarily for such a purpose as to kill time outside the store or to finish another task. In such a case, if calling of the customer is performed when the item ordered by the customer becomes available, it is not possible to hand over the item to the customer unless the customer has returned to the store. If the staff member cannot know the return of the customer to the store, the calling of the customer will be performed after some time again, and thus, it is difficult to hand over the item to the customer promptly when the customer returns to the store.

Further, in the case where, as in the first embodiment, the waiting time of each customer is measured so that a customer who has been waiting for a long time is notified to a staff member to prompt the staff member to perform a necessary customer service behavior, such as speaking to the customer to explain the status and apologize for having the customer wait for a long time, if the customer has not returned to the store when the waiting time of the customer exceeds the reference time, it is not necessary to perform such a customer service behavior. However, if the staff member cannot know the return of the customer to the store afterward, it is difficult to perform the customer service behavior at an appropriate timing.

Further, a required preparation time, which is a time period required till provision of the item to the customer, differs depending on the content of the order of the customer, and thus, it is not practical to determine the timing at which the customer service behavior should be performed uniformly based on a single reference time.

To address such problems, in the second embodiment, when a customer in a state of waiting for the provision of an item exits the store, the exiting is detected and notified to the staff member, and when the customer who exited the store in the state of waiting for the provision of the item has returned to the store, the return is detected and notified to the staff member. Further, the timing at which a customer service behavior should be performed is determined depending on the content of the order of the customer, and the staff member is prompted to perform a customer service behavior at the determined timing. These features will be described in the following in detail.

Figure 8A:
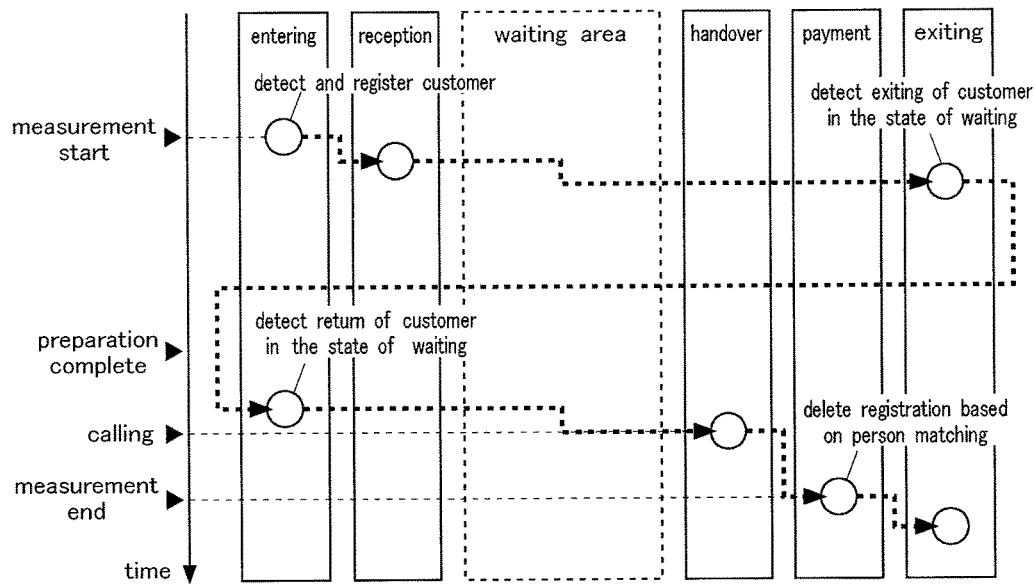
FIGS. 8A and 8B and FIG. 9 are explanatory diagrams for explaining an overview of a customer management process according to the second embodiment of the present invention.
Figure 8B:
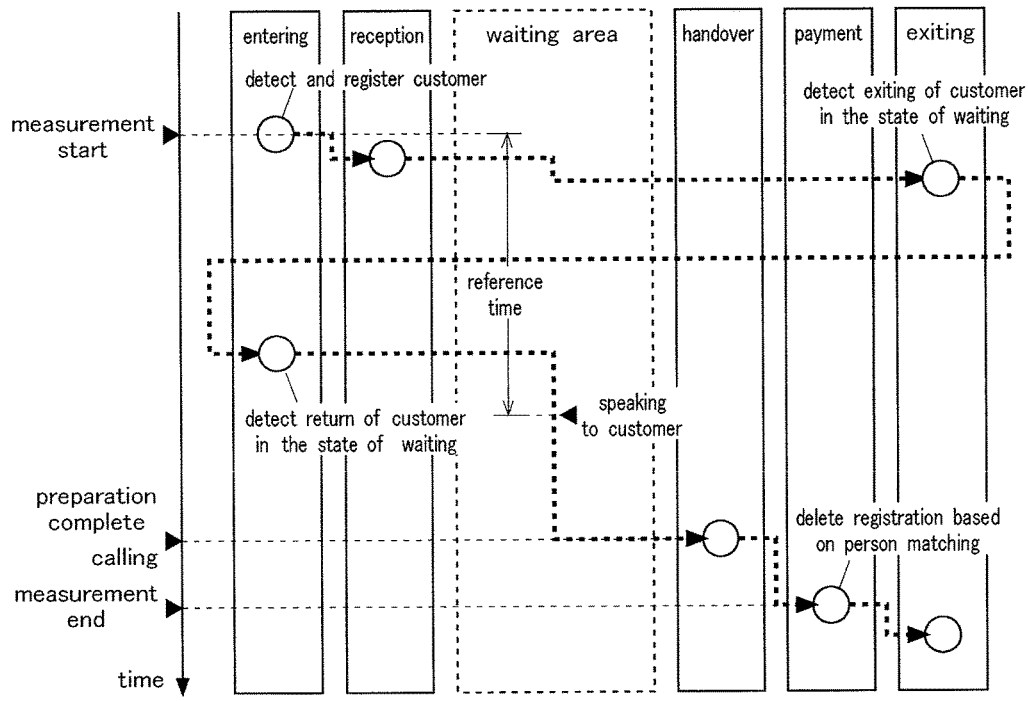
Figure 9:
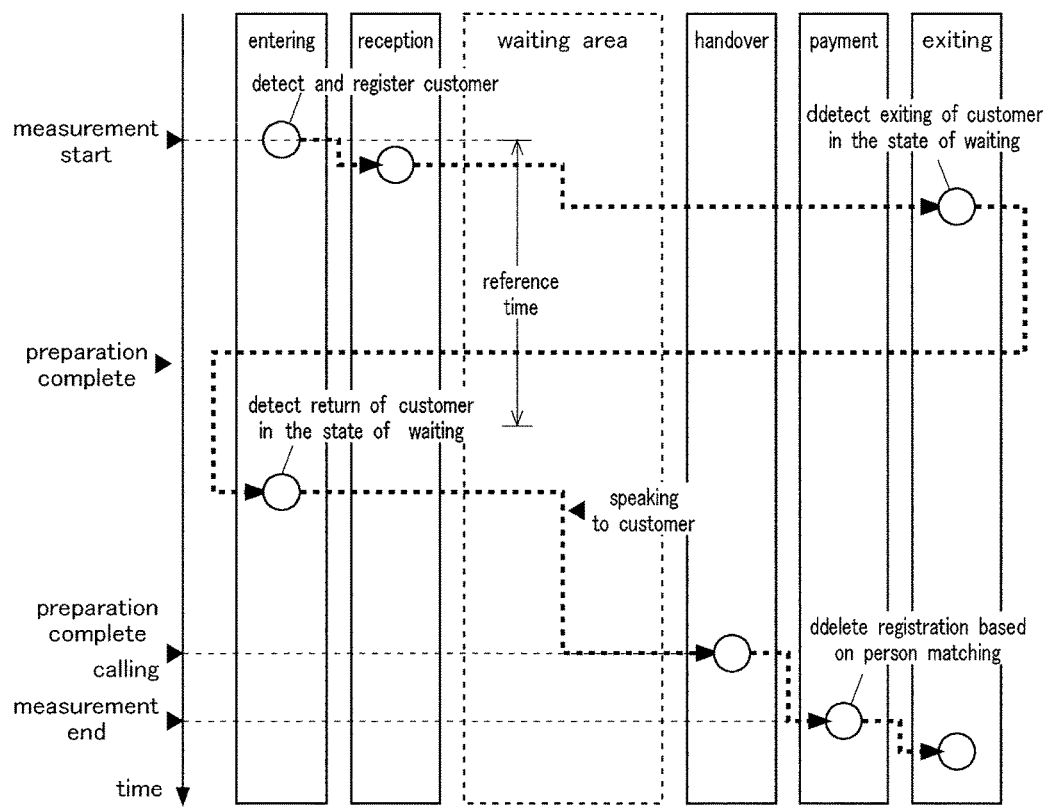

First, a description will be made of an overview of a customer management process according to the second embodiment. FIGS. 8A and 8B and FIG. 9 are explanatory diagrams for explaining an overview of the customer management process according to the second embodiment.

As shown in FIG. 8A, when a customer exits the store, an image of the customer is captured by the exit camera 1e, and based on the person matching performed by use of the captured image, it is detected that a customer in the state of waiting for the provision of an item has exited the store, and this is notified to the staff member. Therefore, when the item preparation work has finished before the customer returns to the store, the staff member does not have to call the customer, and thus, unnecessary labor can be avoided. Then, when the customer returns and enters the store through entrance/exit, an image of the customer is captured by the entrance camera 1a, and based on the person matching performed by use of the captured image, the return to the store of the customer who exited the store is detected and notified to the store staff member. Thereby, the staff member can know that the customer has returned to the store, and thus, can promptly call the customer and hand the item over to the customer.

Further, as shown in FIG. 8B, in a case where the customer who has been out of the store returns to the store before the waiting time, which is measured from the entry of the customer into the store, exceeds the reference time, since the notification made when the customer has returned to the store allows the staff member to know that the customer has returned to the store, the staff member can perform a necessary customer service behavior, such as speaking to the customer to explain the status and apologize for having the customer wait for a long time, when the waiting time exceeds the reference time.

On the other hand, if the customer has not returned to the store when the waiting time exceeds the reference time as shown in FIG. 9, it is not necessary to perform a customer service behavior, and since the staff member knows that the customer is out of the store, the staff member can avoid unnecessary of finding, from among the customers waiting for calling, the customer in question to perform a customer service behavior. Then, when the customer who has been out of the store returns to the store, a notification that the customer has returned is made, and thus, the staff member can perform a necessary customer service behavior, such as speaking to the customer to explain the status and apologize for having the customer wait for a long time customer, promptly when the customer returns to the store.

Figure 10:
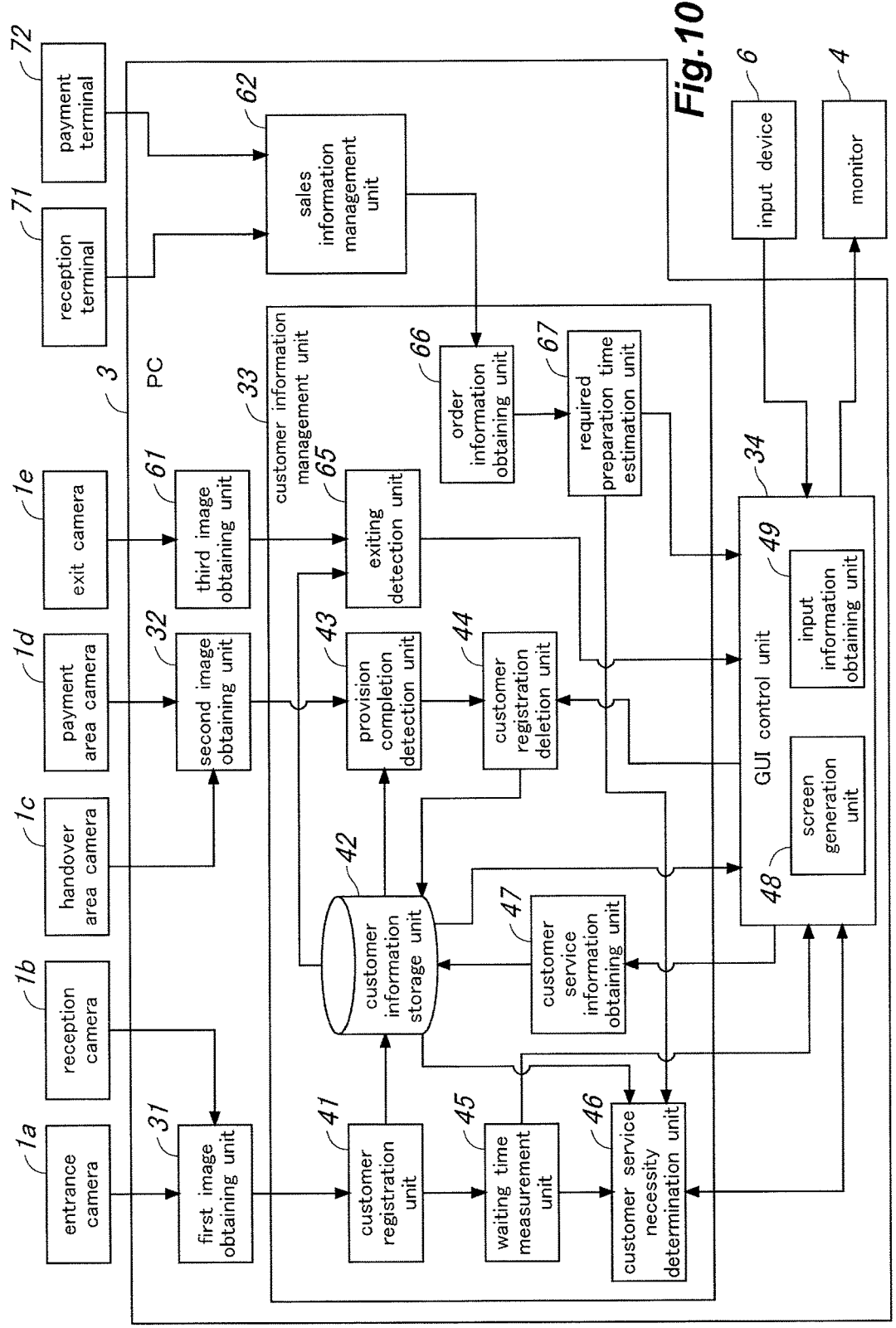
FIG. 10 is a block diagram schematically showing a functional structure of the PC 3 according to the second embodiment.

Next, a detailed description will be given of the customer management process performed by the PC 3 shown in FIG. 1 in the second embodiment. FIG. 10 is a block diagram schematically showing a functional structure of the PC 3 according to the second embodiment.

As in the first embodiment shown in FIG. 5, the PC 3 includes the first image obtaining unit 31, the second image obtaining unit 32, the customer information management unit 33 and the GUI control unit (information provider) 34.

In addition, in the second embodiment, the PC 3 further includes a third image obtaining unit 61 and a sales information management unit 62.

Further, as in the first embodiment shown in FIG. 5, the customer information management unit 33 includes the customer registration unit 41, the customer information storage unit 42, the provision completion detection unit 43, the customer registration deletion unit 44, the waiting time measurement unit 45, the customer service necessity determination unit 46 and the customer service information obtaining unit 47, but the customer information management unit 33 in the second embodiment further includes an exiting detection unit 65, an order information obtaining unit 66 and a required preparation time estimation unit 67.

The third image obtaining unit 61 obtains customer images at the time of exit from the store which are generated by capturing, with the exit camera 1e, images of customers exiting the store through the entrance/exit. Similarly to the first image obtaining unit 31 and the second image obtaining unit 32, the third image obtaining unit 61 performs a person detection process to detect persons from the captured images input from the exit camera 1e and an image processing to cut out an image of a face area of each person detected by the person detection process (face image) from the captured images, and the face images are output as the customer images.

The sales information management unit 62 constitutes a POS (point of sale) system for managing sales information relating to the sales of the store. The sales information management unit 62 obtains, from a reception terminal 71 disposed in the reception area, order information relating to a content ordered by each customer at the time of reception, namely, information relating to the prescription, obtains, from a payment terminal 72 disposed in the payment area, payment information, namely, information relating to the price of each item, etc., and manages the obtained information.

The exiting detection unit 65 of the customer information management unit 33 performs a process of detecting customers who are in the state of waiting for the provision of an item and who have exited the store based on the customer images at the time of exit from the store obtained by the third image obtaining unit 61. In this exiting detection process, person matching is performed between the registered customer images and the customer images at the time of exit from the store to detect the customers who are in the state of waiting for the provision of items and who have exited the store. When the exiting detection unit 65 detects that a customer has exited the store, the GUI control unit 34 performs a process of providing the staff member with information indicating the exiting.

In addition, the exiting detection unit 65 performs a process of detecting, based on the customer images at the time of entry into the store obtained by the first image obtaining unit 31, return to the store of the customers who exited the store in the state of waiting for the provision of items. In this return detection process, person matching is performed between the registered customer images and the customer images at the time of entry into the store to detect the return to the store of the customers who exited the store in the state of waiting for the provision of items. When the exiting detection unit 65 detects that a customer who exited the store has returned to the store, the GUI control unit 34 performs a process of providing the staff member with information indicating the return.

It is to be noted that by performing person matching between the registered customer images and the customer image at the time of entry into the store, it is possible to determine whether a person who has entered the store is a customer who exited the store in the state of waiting for the provision of an item or a new customer visiting the store; namely, if the person who has entered the store is found from among the registered customers, the person is determined to be a customer who exited the store, and if not, the person is determined to be a new customer. Therefore, the customer registration unit 41 can determine that a person determined by the exiting detection unit 65 not to be a customer who exited the store in the state of waiting for the provision of an item is a new customer and perform the registration process for this person.

The order information obtaining unit 66 performs a process of obtaining order information relating to a content ordered by each customer at the time of reception (information on the prescription) from the sales information management unit 62. Further, the order information obtaining unit 66 performs a process of associating the pieces of customer information cumulatively stored in the customer information storage unit 42 with the pieces of order information; namely, determining which piece of order information relates to which customer.

In the reception area, a staff member inputs the order information with the reception terminal 71 in accordance with the order from each customer, and an image of the customer who made the order is captured by the reception camera 1b. Therefore, by performing person matching between the customer images at the time of reception and the customer images at the time of entry into the store, it is possible to associate the pieces of order information obtained by the reception terminal 71 with the pieces of registered customer information, respectively. Further, in a situation where the order of customers at the time of entry into the store is the same as that at the time of reception, as in a case where the entrance/exit and the reception area of the store are located close to each other, it is possible to associate the pieces of order information with the pieces of customer information based on the entry times into the store (times of capture of the customer images at the time of entry into the store) and the times of reception (times of input of the order information at the reception terminal).

The required preparation time estimation unit 67 estimates, based on the order information obtained by the order information obtaining unit 66, a required preparation time for each customer, which is a time period required from the reception of the order from the customer to the provision of the item to the customer. In this required preparation time estimation process, the required preparation time is estimated based on the content of the order, such as the kind of the item, the number of items ordered, etc. Particularly, in a pharmacy selling prescription drugs, preparation of medicine is performed on the prescription, and the preparation of medicine may include time-consuming works such as processing of a pharmaceutical item (crushing of tablets, etc.), weighing and mixing, etc., and the time required for the preparation of medicine changes depending on how time-consuming these works are. Further, the required preparation time also changes depending on the number of pharmaceutical item to be prepared. The required preparation time is estimated by taking into account these factors.

The customer service necessity determination unit 46 sets a reference time depending on the required preparation time estimated by the required preparation time estimation unit 67, and determines, based on the reference time, whether it is necessary to perform a customer service behavior, such as speaking to the customer to explain the status and apologize for having the customer wait for a long time. In the case of a pharmacy selling prescription drugs, the reference time is set to 30 minutes when processing of a pharmaceutical item(s) is required, and set to 15 minutes when it is only required to select necessary items and package them, for example. It is possible to set more reference times depending on the number of pharmaceutical items and the content of the preparation of medicine. Further, in a case where the customer is a regular customer, it is possible to determine the reference time by referring to the past data of the customer such as an average time obtained based on multiple waiting times in the past. Further, in a case where it is anticipated based on the content of the order (prescription information) that a certain customer will be moved down in the order of handover of the items, it is possible to determine immediately after the reception of the customer that it is necessary to perform a customer service behavior for the first time.

Further, when the exiting detection unit 65 detects that a customer in the state of waiting for the provision of an item exited the store, the customer service necessity determination unit 46 determines that a customer service behavior is not necessary for this customer even if the waiting time of the customer obtained by the waiting time measurement unit 45 has exceeded the reference time, and accordingly, does not perform the customer service necessity determination for the customer.

It is to be noted that in the second embodiment, the PC 3 is configured to include the customer information management unit 33 and the sales information management unit 62 such that the PC 3 serves both as a customer management device and as a sales information management device. However, a sales information management device may be configured by an information processing device separate from the PC 3 serving as the customer management device.

Further, in a case where the customers are prohibited from temporarily exiting the store as a general rule according to the policy of the store, for example, it is possible to, when it is detected that a customer exits the store before payment, temporarily stop the counting of the waiting time by the customer measurement unit 45, to set the reference time longer by the time while the customer was out of the store, to perform the customer service necessity determination based on the waiting time after the customer returned to the store, and/or to stop performing a customer service behavior (speaking to the customer) to the customer who has returned from the temporary exit. Thus, the conditions involved in the customer service necessity determination can be variably set in accordance with the demands of the store.

Figure 11:
FIG. 11 is an explanatory diagram showing a customer state display screen displayed on the monitor 4 according to the second embodiment.
Figure 12:
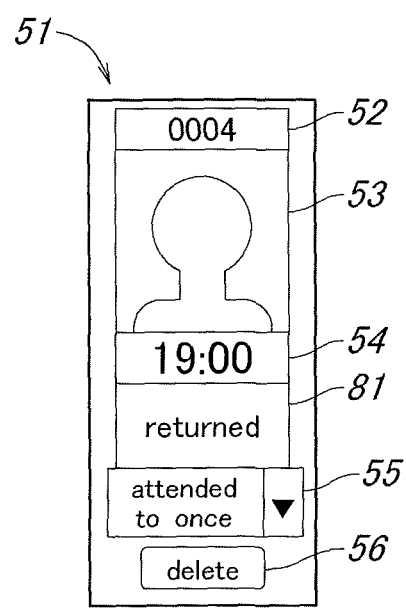
FIG. 12 is an explanatory diagram showing a part of the customer state display screen shown in FIG. 11.

Next, a description will be given of the customer state display screen displayed on the monitor 4 shown in FIG. 10. FIG. 11 is an explanatory diagram showing the customer state display screen displayed on the monitor 4 according to the second embodiment. FIG. 12 is an explanatory diagram showing a part of the customer state display screen shown in FIG. 11.

The screen generation unit 48 of the GUI control unit 34 shown in FIG. 10 performs a process of generating display information relating to a customer state display screen in which the states of registered customers are in a list, such that the customer state display as shown in screen FIG. 11 is displayed on the monitor 4.

In this customer state display screen, as in the first embodiment shown in FIG. 6, the customer information display parts 51 displaying the customer information of respective customers are arranged side by side in vertical and horizontal directions. Particularly, in this embodiment, the customer information display parts 51 are grouped depending on the location of the customers ("waiting area" or "out of store"), whereby the customers in the waiting area are displayed in the field of "waiting area," while the customers who have exited the store are displayed in the field of "out of store." When a customer has entered the store and been registered, the customer information display part 51 of the customer is displayed in the field of "waiting area," and when the customer exits the store before payment, the customer information display part 51 of the customer is moved from the field of "waiting area" to the field of "out of store." Thereafter, when the customer returns to the store, the customer information display part 51 is moved from the field of "out of store" to the field of "waiting area."

Further, in this customer state display screen, the customer information display parts 51 are displayed such that they are grouped depending on the length of the required preparation time (time required till handover of the ordered item). Particularly, in this embodiment, the customer information display parts 51 are divided into three groups; namely, "short," "middle" and "long." The grouping based on the required preparation time is performed in each of the field of "waiting area" and the field of "out of store," whereby the customer information display parts 51 are grouped into six groups in total. It is to be noted that the number of groups relating to the grouping depending on the required preparation time is not limited to three. For example, the customer information display parts 51 may be grouped into two groups of "short" and "long" or may be grouped into four or more groups.

As shown in FIG. 12, the customer information display part 51 is provided with the serial number display part 52, the customer image display part 53, the waiting time display part 54, the customer service information input/display part 55 and the deletion operation part (delete button) 56 as in the first embodiment FIG. 7. In the second embodiment, the customer information display part 51 further include an exiting state display part 81. This exiting state display part 81 displays state information relating to exiting; more specifically, the exiting state display part 81 becomes blank when the customer is in the store, displays a string of letters "out of store" when the customer is out of the store, and displays a string of letters "returned" when the customer returns to the store.

It is also possible to display, in each customer information display part 51 of the customer state display screen, the required preparation time estimated by the required preparation time estimation unit 67 as a concrete numerical value. In this way, it is possible to present the remaining time to the customer when a customer service behavior, such as speaking to the customer to explain the status and apologize for having the customer wait for a long time, is performed, and thus, the customer satisfaction can be improved even further.

Figure 13:
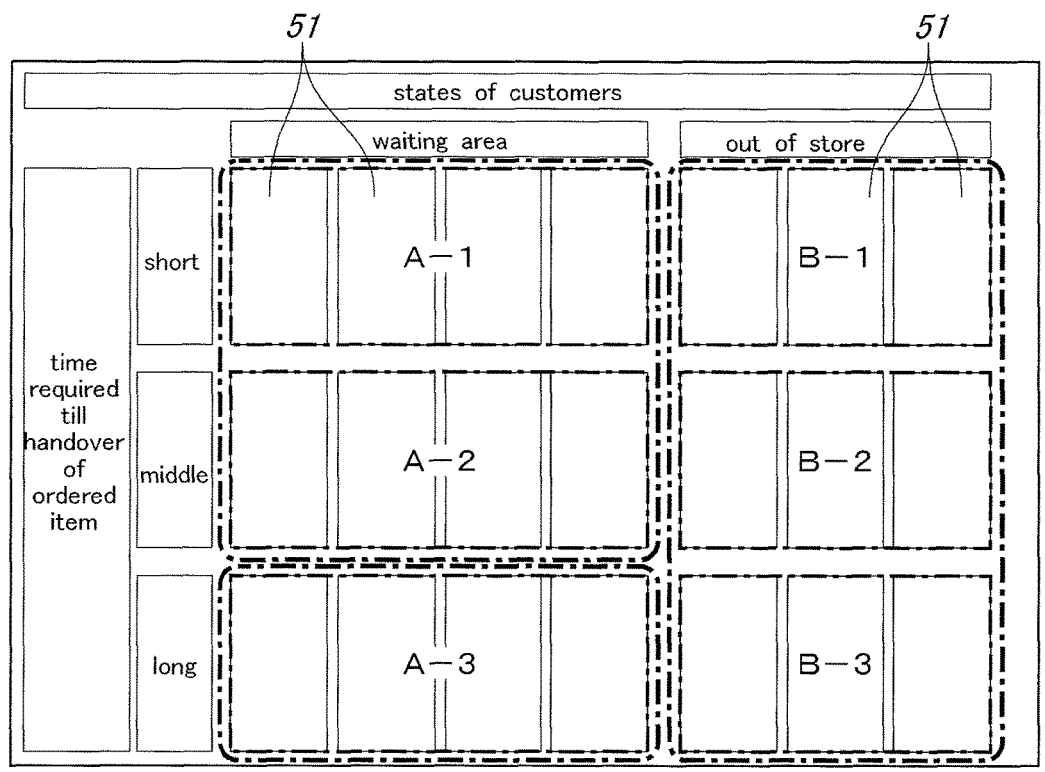
FIG. 13 is an explanatory diagram for explaining the positioning of each group in the customer state display screen.

Next, a description will be given of the positioning of each group in the customer state display screen shown in FIG. 11. FIG. 13 is an explanatory diagram for explaining the positioning of each group in the customer state display screen.

In the customer state display screen, the customer information display parts 51 displaying the customer information of respective customers are grouped into six groups A-1 to A-3 and B-1 to B-3 depending on the location of the customer ("waiting area" or "out of store") and the required preparation time (time required till handover of the item), such that management of customers can be performed in accordance with these groups A-1 to A-3 and B-1 to B-3.

For example, by managing the progress of item preparation works (preparation of medicine) depending on the number of customers in each of groups A-1 to A-3 and B-1 to B-3, it is possible to efficiently perform the handover of the items, and in a case where multiple windows are provided in the handover area, to improve the rate of usage of the windows. This makes it possible to reduce the waiting time of the customers to thereby improve the customer satisfaction and stream line the operation of the store.

Specifically, the priority level of each item preparation work is determined by the store in accordance with groups A-1 to A-3 and B-1 to B-3. For example, for the customers in groups B-1 to B-3, namely, the customers who are out of the store, the priority level of the item preparation work is lowered. On the other hand, for the customers in groups A-1 and A-2, namely, of the customers present in the waiting area, those whose required preparation time is determined to be short or middle, the priority level of the item preparation work is raised to increase the rate of usage. Further, for the customers in group A-3, namely, of the customers present in the waiting area, those whose required preparation time is determined to be long, the item preparation work is performed depending on the state of the customers in groups A-1 and A-2, such that the rates of usage of the windows are leveled.

Further, there is a tendency that the customers whose required preparation time is short are large in number but their average spending per customer, namely, a sales amount per customer, is small, while the customers whose required preparation time is long are small in number but their average spending per customer is high. Thus, in view of such an average spending per customer, by managing the progress of item preparation works in accordance with the respective numbers of customers whose required preparation time is short, whose required preparation time is middle, and whose required preparation time is long, it is possible to increase the sales and profit of the store.

In addition, by comparing the time required actually from the reception to the handover of the item with the estimated required preparation time, it is possible to grasp the problems relating to the item preparation works; for example, if the actually required time is much longer than the estimated time, it is considered that there is a problem that decreases the efficiency of the item preparation works.

As described above, in the illustrated embodiment, when a customer in the state of waiting for the provision of an item exits the store, the exiting is detected and notified to the staff member, and thus, the staff member can know that the customer in the state of waiting for the provision of an item has exited the store. Therefore, it is possible to avoid unnecessarily calling the customer and improve the work efficiency of the staff member.

Further, in the illustrated embodiment, when a customer who exited the store in the state of waiting for the provision of the item has returned to the store, the return is detected and notified to the staff member, and thus, the staff member can know that the customer who exited the store in the state of waiting for the provision of an item has returned to the store. Therefore, it is possible to perform calling of the customer promptly to hand over the item to the customer.

Further, in the illustrated embodiment, the states of the multiple customers are displayed in the customer state display screen such that the customers are grouped into those who are staying in the store and those who are out of the store. Thereby, the staff member can grasp separately the states of the customers staying in the store and the states of the customers out of the store, and thus, the staff member can provide an appropriate customer service easily.

Further, in the illustrated embodiments, the required preparation time for each customer, which is a time period required from the reception to the provision of the item, is estimated, and the required preparation time is presented to the staff member. Thereby, the staff member can grasp the required preparation time for each customer, and thus, can provide an appropriate customer service in accordance with the required preparation time.

Further, in the illustrated embodiments, the states of the multiple customers are displayed in the customer state display screen such that the customers are grouped depending on the length of the required preparation time. Thereby, the staff member can grasp the states of the customers for each of the groups defined depending on the length of the required preparation time, and thus, can provide an even more appropriate customer service.

Although the present invention has been described in terms of preferred embodiments thereof, these embodiments are mere examples and the present invention is not limited by the embodiments. It is also to be noted that not all of the structural elements of the customer management device, customer management system and customer management method shown in the foregoing embodiments are necessarily indispensable, and they may be selectively used as appropriate without departing from the spirit of the present invention.

For example, in the foregoing embodiments, a description was made of an example in which a commercial establishment is a pharmacy selling prescription drugs, but the present invention may be applicable broadly to any commercial establishment that provide items to customers in response to the orders from the customers, namely, commercial establishment that is selling items that need preparation. Further, the commercial establishment may provide articles other than commercial items to the customers or may provide services. For example, the present invention is applicable to commercial establishments such as a bank or a mobile phone shop, where various services are provided.

Further, in the foregoing embodiments, as a customer service behavior, the staff member speaks to the customer waiting for calling in the waiting area. However, the customer service behavior may be speaking to the customer at the time of handover or payment to apologize for having had the customer wait for a long time. Further, a customer service behavior other than speaking to the customer may be performed as necessary based on the customer information provided to the user (such as the staff member).

Further, in the foregoing embodiments, the reception of items by customers is detected based on the customer images to delete the registration of the customers who received the items. However, the reception of items by customers may be detected based on information input with a terminal or the like disposed in the handover area or the payment area.

Further, in the foregoing embodiments, the first to third image obtaining units 31, 32, 61 were provided in the PC 3, but an image obtaining device may be provided separately from the PC 3. Such an image obtaining device may be integrated with each of the cameras 1a to 1e to constitute an imaging device equipped with an image obtaining function.

Further, in the foregoing embodiment, the processes necessary for customer management were performed by the PC 3, but these processes may be performed by the PC 11 set up at the management office or a cloud computer 21 forming a cloud computing system, as shown in FIG. 1. Further, these necessary processes may be performed by cooperation of multiple information processing devices, in which case, the multiple information processing devices are configured to be able to communicate or share information with each other via a communication medium such as an IP network or LAN. Thereby, the multiple information processing devices jointly executing the necessary processes constitute a customer management system.

In this case, it is preferred that the device set up at the store be configured to perform at least the customer image obtaining process. In such a structure, since the information obtained by the customer image obtaining process has a small amount of data, even if the remaining processes are performed by an information processing device set up at a place other than the store, such as the PC 11 disposed at the management office, the communication load can be small, and thus, it is easy to operate the system in the form of a wide area network.

It may be also preferred that the cloud computer 21 be configured to perform at least a part of the customer image obtaining process that requires a large amount of computation. In such a structure, the process requiring a large amount of computation is achieved by the cloud computer 21, and therefore, it is not necessary to prepare a high-speed information processing device on the user side, namely at the store or the like. Further, since the remaining processes require a small amount of computation, the remaining processes can be performed as extended functions of an information processing device set up at the store to serve as a sales information management device, and this can reduce the cost born by the user.

The cloud computer 21 may be configured to perform the entirety of the necessary processes or may be configured to perform, of the necessary processes, at least the customer information providing process. In such a structure, it becomes possible to view the customer state on a mobile terminal such as a smartphone 22 in addition to the PC 3 set up at the store and the PC 11 set up at the management office, and this allows a user to view the customer state not only at the store or the management office but also at any other place, such as a place the user is visiting on business.

Further, in the foregoing embodiment, the customer information was output on the monitor 4 of the PC 3 disposed at the store, but an output device for outputting the customer information may be provided separately from the PC 3. For example, it is possible to use the PC 11 disposed at the management office or the smartphone 22 described above as a browser device for viewing the customer information. Besides, it is also possible to add the function of the browser device for viewing the customer information to a sales information management device disposed at the store. The customer information may be output from a printer.

Further, in the foregoing embodiments, the customer information was output to the monitor 4 of the PC 3 disposed in the office room of the store, and the input operations were performed with the input device 6 connected to the PC 3 as shown in FIG. 2. However, it is possible to provide, besides the PC 3, an information processing device to which the customer information is output and with which the input operations are performed, particularly, a portable information processing device, such as a tablet-type terminal. Such an information processing device may be carried by any appropriate person such as a staff member in charge of customer service, a staff member at the reception area, etc. or may be disposed at an appropriate place in the store, whereby the staff members can view the customer information and perform input operations with the information processing device.

The customer management device, customer management system and customer management method according to the present invention can detect without fail the states of customers requiring a customer service behavior, to thereby improve the customer satisfaction, and thus, are useful as a customer management device, a customer management system and a customer management method for managing the states of customers visiting a commercial establishment that provides articles or services to the customers in response to the orders from the customers.

The invention claimed is:

1. A customer management device for managing states of customers visiting a commercial establishment that provides articles or services to the customers in response to orders from the customers, the customer management device comprising:
   a processor; and
   a memory storing instructions,
   wherein the processor, when performing the instructions stored in the memory, performs operations comprising:
   receiving an image captured by a camera mounted in the commercial establishment;
   obtaining first customer images of customers, by detecting, from the image, customers and cutting out face images of the customers at a point from when the customers enter the commercial establishment till when the customers go through reception procedures;
   obtaining second customer images of customers, by detecting, from the image, customers and cutting out face images of the customers at a point of at least one of when the customers receive the articles or services or when the customers make payment;
   generating customer information, including face images of customers in a state of waiting for provision of the articles or services, by matching the first customer images and the second customer images and excluding matched images from the first customer images;
   providing a user with the generated customer information;
   obtaining third customer images of customers, by detecting, from the image, customers and cutting out face images of the detected customers at a point exiting the commercial establishment; and
   detecting an exiting customer by matching the face images of the customer information and the third customer images and excluding unmatched images from the face images of the customer information, the exiting customer being a customer in the state of waiting for provision of the articles or services and who has exited the commercial establishment,
   wherein, in the providing of customer information, the user is provided with information indicating the exiting customer based on a detection result in the detecting of the existing customer,
   in the obtaining of first customer images, the first customer images at a time of entry into the commercial establishment are obtained by capturing images of customers entering the commercial establishment;
   the detecting further detects a returning customer by matching the face images of the customer information and the first customer images at the time of entry into the commercial establishment, the returning customer being the customer who exited the commercial establishment in the state of waiting for the provision of the articles or services and has returned to the commercial establishment; and the providing of customer information further provides the user with information indicating the returning customer based on a detection result in the detecting of the returning customer.

2. The customer management device according to claim 1, wherein:
in the providing of customer information, display information is generated, the display information relating to a customer state display screen, in which the customer information of each of a plurality of customers is provided in a list, and the customer state display screen is displayed on a display; and
the customer state display screen includes at least a first area and a second area, which is separate from the first area, and displays a customer staying in the commercial establishment in the first area and a customer who is out of the commercial establishment in the second area,
in response to detecting the exiting customer, the detected exiting customer is moved from the first area to the second area, and
in response to detecting the returning customer, the detected returning customer is moved from the second area to the first area.

3. A customer management system for managing states of customers visiting a commercial establishment that provides articles or services to the customers in response to orders from the customers, the system comprising:
a camera mounted in the commercial establishment and capturing an image of the commercial establishment; and
a plurality of information processors,
wherein the plurality of information processors jointly perform operations comprising:
obtaining first customer images of customers from the image captured with the camera, by detecting, from the image, customers and cutting out face images of the customers at a point from when the customers enter the commercial establishment till when the customers go through reception procedures;
obtaining second customer images of customers from the image captured with the camera, by detecting, from the image, customers and cutting out face images of the customers at a point of at least one of when the customers receive the articles or services or when the customers make payment;
generating customer information, including face images of customers in a state of waiting for provision of the articles or services, by matching the first customer images and the second customer images and excluding matched images from the first customer images;
providing a user with the generated customer information;
obtaining third customer images of customers from the image captured with the camera, by detecting, from the image, customers and cutting out face images of the customers exiting the commercial establishment; and
detecting an exiting customer by matching the face images of the customer information and the third customer images and excluding unmatched images from the face images of the customer information, the exiting customer being a customer in the state of waiting for provision of the articles or services and who has exited the commercial establishment,
wherein, in the providing of customer information, the user is provided with information indicating the exiting customer based on a detection result in the detecting of the existing customer,
in the obtaining of first customer images, the first customer images at a time of entry into the commercial establishment are obtained by capturing images of customers entering the commercial establishment;
the detecting further detects a returning customer by matching the face images of the customer information and the first customer images at the time of entry into the commercial establishment, the returning customer being the customer who exited the commercial establishment in the state of waiting for the provision of the articles or services and has returned to the commercial establishment; and
the providing of customer information further provides the user with information indicating the returning customer based on a detection result in the detecting of the returning customer.

4. A customer management method for performing, with an information processor, a process of managing states of customers visiting a commercial establishment that provides articles or services to the customers in response to orders from the customers, the method comprising:
capturing an image by a camera mounted in the commercial establishment;
obtaining first customer images of customers, by detecting, from the image, customers and cutting out face images of the customers at a point from when the customers enter the commercial establishment till when the customers go through reception procedures;
obtaining second customer images of customers, by detecting, from the image, customers and cutting out face images of the customers at a point of at least one of when the customers receive the articles or services or when the customers make payment;
generating customer information, including face images of customers in a state of waiting for provision of the articles or services, by matching the first customer images and the second customer images and excluding matched images from the first customer images;
providing a user with the customer information;
obtaining third customer images of customers, by detecting, from the image, customers and cutting out face images of the customers at a point exiting the commercial establishment; and
detecting an exiting customer by matching the face images of the customer information and the third customer images and excluding unmatched images from the face images of the customer information, the exiting customer being a customer in the state of waiting for provision of the articles or services and who has exited the commercial establishment,
wherein, in the providing of customer information, the user is provided with information indicating the exiting customer based on a detection result in the detecting,
wherein at least one of the obtaining first customer images, the obtaining second customer images the generating customer information, and the providing the customer information is performed by a processor,
in the obtaining of first customer images, the first customer images at a time of entry into the commercial establishment are obtained by capturing images of customers entering the commercial establishment;
the detecting further detects a returning customer by matching the images of the customer information and the first customer images at the time of entry into the commercial establishment, the returning customer being the customer who exited the commercial establishment in the state of waiting for the provision of the articles or services and has returned to the commercial establishment; and the providing of customer information further provides the user with information indicating the returning customer based on a detection result in the detecting of the returning customer.

5. The customer management system according to claim 3, wherein:

in the providing of customer information, display information is generated, the display information relating to a customer state display screen, in which the customer information of each of a plurality of customers is provided in a list, and the customer state display screen is displayed on a display; and the customer state display screen includes at least a first area and a second area, which is separate from the first area, and displays a customer staying in the commercial establishment in the first area and a customer who is out of the commercial establishment in the second area, in response to detecting the exiting customer, the detected exiting customer is moved from the first area to the second area, and in response to detecting the returning customer, the detected returning customer is moved from the second area to the first area.

6. The customer management method according to claim 4, wherein:

in the providing of customer information, display information is generated, the display information relating to a customer state display screen, in which the customer information of each of a plurality of customers is provided in a list, and the customer state display screen is displayed on a display; and the customer state display screen includes at least a first area and a second area, which is separate from the first area, and displays a customer staying in the commercial establishment in the first area and a customer who is out of the commercial establishment in the second area, in response to detecting the exiting customer, the detected exiting customer is moved from the first area to the second area, and in response to detecting the returning customer, the detected returning customer is moved from the second area to the first area.

* * * * *